(12) United States Patent
Suzuki et al.

(10) Patent No.: US 10,566,925 B2
(45) Date of Patent: Feb. 18, 2020

(54) MOTOR CONTROL DEVICE

(71) Applicant: DENSO CORPORATION, Kariya, Aichi-pref. (JP)

(72) Inventors: Haruo Suzuki, Kariya (JP); Hiroyasu Otake, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/183,135

(22) Filed: Nov. 7, 2018

(65) Prior Publication Data
US 2019/0149083 A1 May 16, 2019

(30) Foreign Application Priority Data
Nov. 13, 2017 (JP) .................... 2017-218342

(51) Int. Cl.
*H02P 29/68* (2016.01)
*G05B 5/00* (2006.01)
(Continued)

(52) U.S. Cl.
CPC .............. *H02P 29/68* (2016.02); *H02M 1/32* (2013.01); *H02M 7/5387* (2013.01); *H02M 2001/327* (2013.01)

(58) Field of Classification Search
CPC . G05B 5/00; G05D 23/00; H02H 7/08; H02P 1/00; H02P 1/04; H02P 1/46; H02P 3/00;
(Continued)

(56) References Cited

U.S. PATENT DOCUMENTS 6,392,376 B1 * 5/2002 Kobayashi ............ B60L 15/025
318/432
2015/0084570 A1 3/2015 Hara
(Continued)

FOREIGN PATENT DOCUMENTS

JP 2004-082757 A 3/2004
JP 2014-036475 A 2/2014
(Continued)

*Primary Examiner* — Antony M Paul
(74) *Attorney, Agent, or Firm* — Knobbe, Martens, Olson & Bear, LLP

(57) ABSTRACT

A motor control device of an electric motor includes: a board with a heat sink; multiple switching elements; a drive circuit IC; a control circuit IC; first and second temperature sensors; a temperature information processing unit; and an abnormality determination unit. An out-of-normal-range state is a state where a temperature deviation exceeds a normal deviation threshold, and it is impossible to determine which one of the first and second temperature sensors is abnormal. When both sensors are normal, the temperature information processing unit uses one of first and second detected temperatures. When one sensor is abnormal and the other is normal, the temperature information processing unit uses one of the first and second detected temperatures of a normal sensor. When both sensors fall in the out-of-normal-range state, the temperature information processing unit uses one of the first and second detected temperatures which meets a predetermined condition.

15 Claims, 20 Drawing Sheets

(51) Int. Cl.
*G05D 23/00* (2006.01)
*H02M 1/32* (2007.01)
*H02M 7/5387* (2007.01)

(58) Field of Classification Search
CPC ...... H02P 3/16; H02P 3/18; H02P 5/00; H02P 7/00; H02P 11/00; H02P 21/00; H02P 23/00; H02P 27/00; H02P 27/04; H02P 27/06; H02P 27/08
USPC .... 318/400.01, 400.02, 400.14, 400.15, 700, 318/701, 721, 779, 799, 800, 801
See application file for complete search history.

(56) References Cited

U.S. PATENT DOCUMENTS

| | | |
|---|---|---|
| 2017/0104439 A1 | 4/2017 | Kobayashi et al. |
| 2018/0154887 A1* | 6/2018 | Murata .................... H02P 5/00 |

FOREIGN PATENT DOCUMENTS

| | | |
|---|---|---|
| JP | 2014-148244 A | 8/2014 |
| JP | 2014-168340 A | 9/2014 |
| JP | 2015-061458 A | 3/2015 |
| JP | 2016-178799 A | 10/2016 |
| JP | 2017-050920 A | 3/2017 |
| JP | 2017-073898 A | 4/2017 |

* cited by examiner

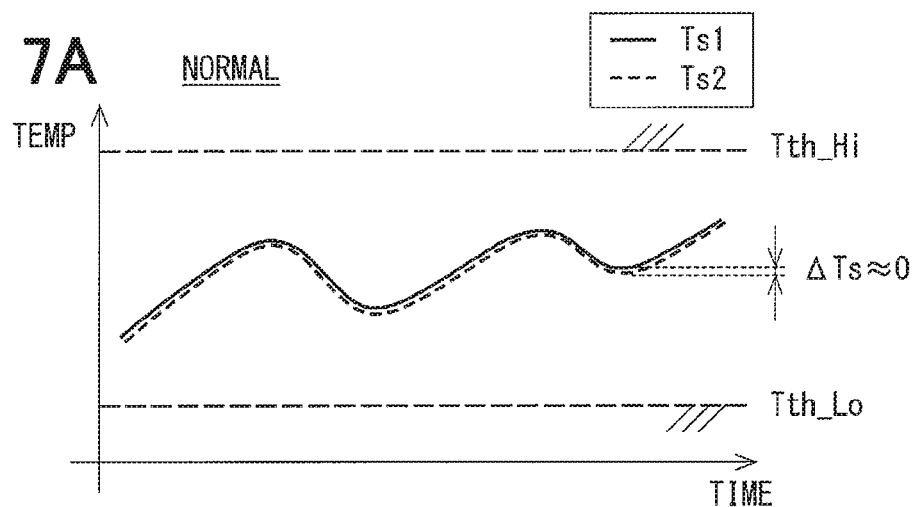
FIG. 7A NORMAL
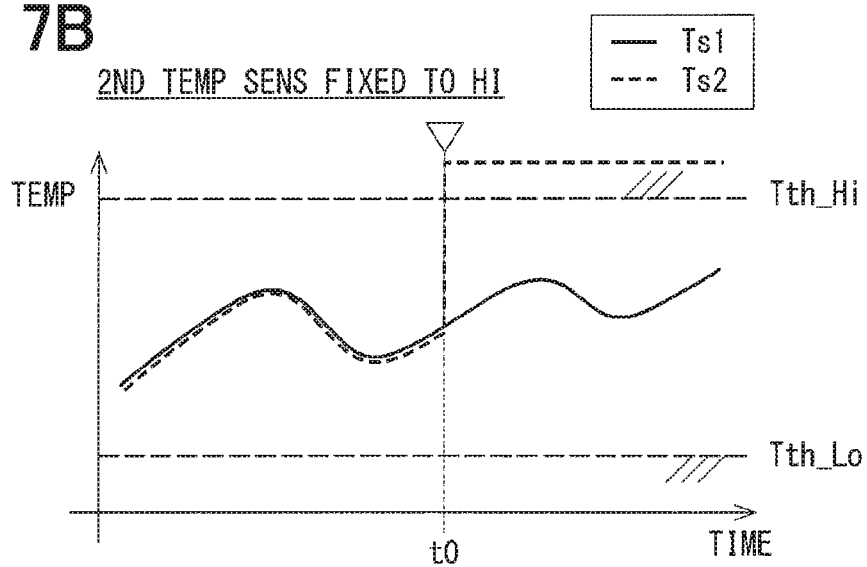
FIG. 7B 2ND TEMP SENS FIXED TO HI
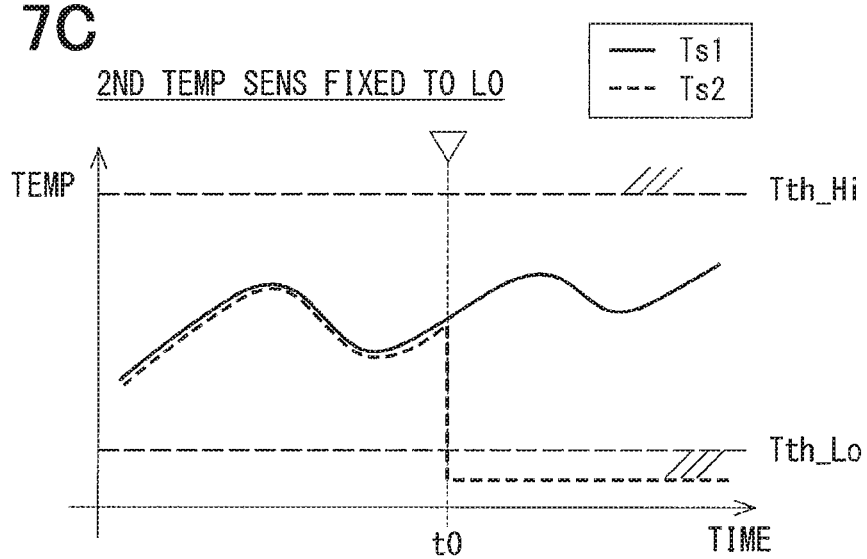
FIG. 7C 2ND TEMP SENS FIXED TO LO

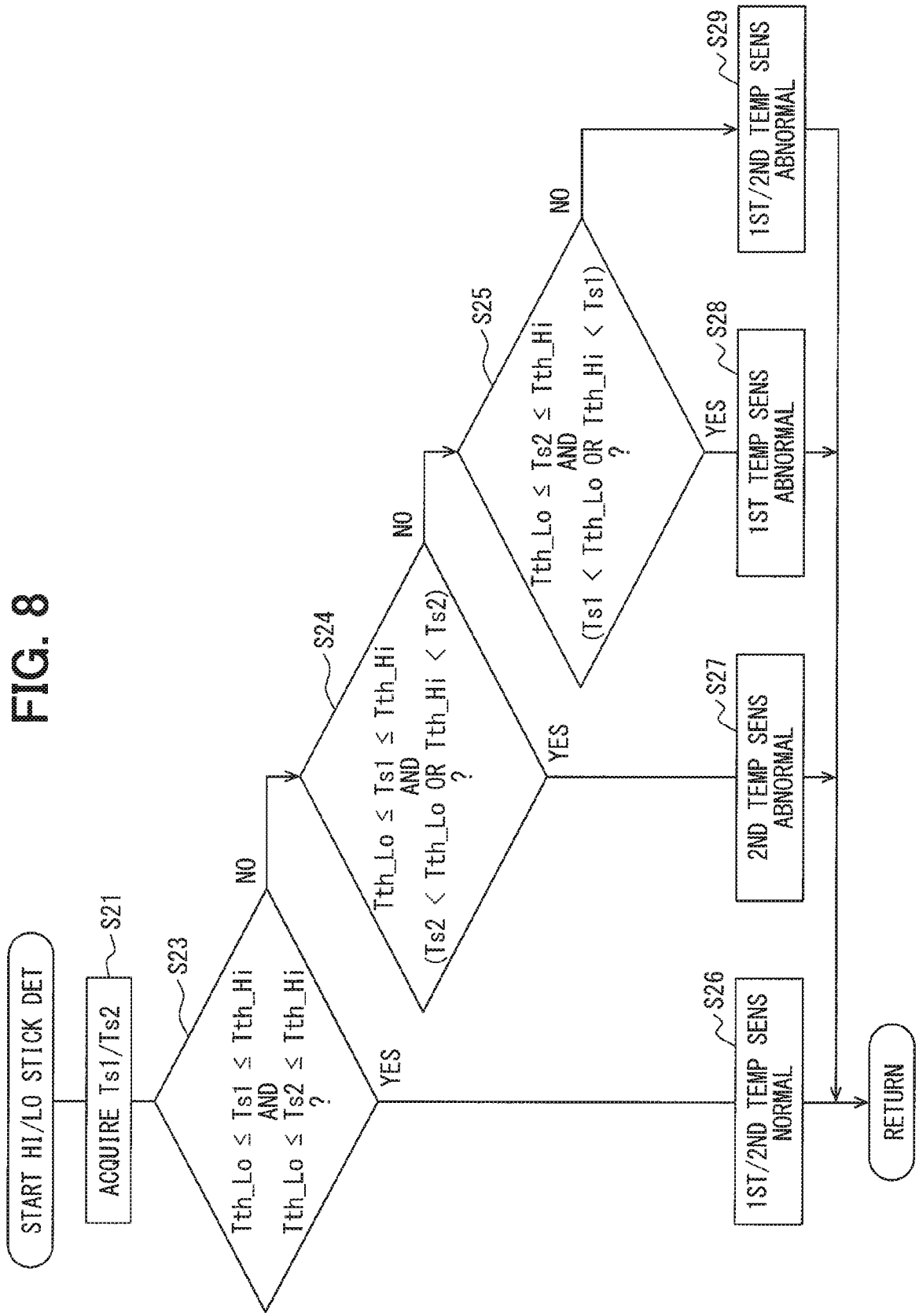

MOTOR CONTROL DEVICE

CROSS REFERENCE TO RELATED APPLICATION

This application is based on Japanese Patent Application No. 2017-218342 filed on Nov. 13, 2017, the disclosure of which is incorporated herein by reference.

TECHNICAL FIELD

The present disclosure relates to relates to a motor control device for controlling energization of an electric motor.

BACKGROUND

Up to now, a motor control device has been known which detects a temperature of a board on which a control unit for controlling energization of an electric motor is mounted by a temperature sensor, and changes a current limit value or the like according to the detected temperature.

For example, in a device disclosed in JP-A-2004-82757 (Patent Literature 1), two temperature sensors are provided on a board and a heat sink. The device compares detected temperatures detected by the temperature sensors with a predetermined upper limit value and a predetermined lower limit value to determine whether there are an upper limit value failure and a lower limit value failure of the temperature sensors, or not. In addition, when an estimated temperature estimated from a current flowing through an electric motor is rising, the device compares a change in the detected temperature with a change in the estimated temperature, to thereby determine whether there is a fixation failure of the temperature sensor, or not.

The device of Patent Literature 1 individually determines whether there is a failure in each of the temperature sensors, or not. However, in individual determination, even if each temperature sensor is not determined to be abnormal, a deviation exceeding a predetermined temperature difference may occur in the detected temperatures of the two temperature sensors in some cases. In such a case, at least one of the temperature sensors is considered to be abnormal, but it is unknown which temperature sensor is abnormal.

For example, the detected temperature detected by the temperature sensor is used as temperature information for a temperature information processing unit to perform a predetermined process. If the detected temperature detected by an abnormal temperature sensor is used, an error may occur in processing by the temperature information processing unit. In the present specification, "a state in which the detected temperatures of two temperature sensors deviate from each other beyond a normal deviation threshold and which of the temperature sensors is abnormal cannot be identified" is defined as "outside a normal range". In the conventional art of Patent Literature 1, there is no disclosure of an abnormality in which the detected temperatures of the two temperature sensors deviate from each other beyond a predetermined temperature difference and a concept of "outside the normal range". Therefore, in such a case, there is a problem that the detected temperature used for processing by the temperature information processing unit is not appropriately selected, and the reliability of the processing by the temperature information processing unit is lowered.

Patent Literature 1: JP-2004-82757-A

SUMMARY

It is an object of the present disclosure to provide a motor control device that appropriately selects a detected temperature used for processing by a temperature information processing unit when the detected temperatures of two temperature sensors deviate from each other beyond a normal deviation threshold.

According to an aspect of the present disclosure, a motor control device that controls energization of an electric motor, includes: a board that radiates heat generated during energization to a heat sink; a plurality of switching elements that are mounted on the board and provide a power converter which supplies an electric power to the electric motor; a drive circuit IC that is mounted on the board and includes a pre-driver which outputs a drive signal to the plurality of switching elements; a control circuit IC that is mounted on the board and includes a current control unit which calculates a command signal to the pre-driver based on an output command to the electric motor; a first temperature sensor and a second temperature sensor that detect temperature at one or two places in at least one of the heat sink, the board, the control circuit IC, the drive circuit IC, the switching element and the electric motor; a temperature information processing unit that performs a predetermined process using temperature information on at least one of a first detected temperature detected by the first temperature sensor and a second detected temperature detected by the second temperature sensor; and an abnormality determination unit that determines an abnormal state of the first and second temperature sensors based on a first detected temperature equivalent amount of the first temperature sensor and a second detected temperature equivalent amount of the second temperature sensor. The first detected temperature equivalent amount is defined by an output value of the first temperature sensor or the first detected temperature calculated by converting the output value of the first temperature sensor. The second detected temperature equivalent amount is defined by an output value of the second temperature sensor or the second detected temperature calculated by converting the output value of the second temperature sensor. A temperature deviation is defined as an absolute value of a difference between the first detected temperature equivalent amount and the second detected temperature equivalent amount. An out-of-normal-range state is defined by a state where the temperature deviation exceeds a normal deviation threshold, and it is impossible to determine which one of the first and second temperature sensors is abnormal. When the abnormality determination unit determines that both of the first temperature sensor and the second temperature sensor are normal, the temperature information processing unit uses at least one of the first detected temperature and the second detected temperature. When the abnormality determination unit determines that one of the first temperature sensor and the second temperature sensor is abnormal and the other of the first and second temperature sensors is normal, the temperature information processing unit uses one of the first detected temperature and the second detected temperature which is obtained from the one of the first temperature sensor and the second temperature sensor as a normal temperature sensor. When the abnormality determination unit determines that both of the first temperature sensor and the second temperature sensor fall in the out-of-normal-range state, the temperature information processing unit uses one of the first detected temperature and the second detected temperature which meets a predetermined condition.

In the above motor control device, even when the two temperature sensors fall outside the normal range, the temperature information processing unit can appropriately select the detected temperature used by the temperature information processing unit according to a predetermined condition.

BRIEF DESCRIPTION OF THE DRAWINGS

The above and other objects, features and advantages of the present disclosure will become more apparent from the following detailed description made with reference to the accompanying drawings. In the drawings:

FIG. 7A is a time chart of a normal state, FIG. 7B is a time chart of a Hi fixation abnormality, and FIG. 7C is a time chart of a Lo fixation abnormality.

FIG. 8 is a flowchart of a Hi/Lo sticking determination;

DETAILED DESCRIPTION

Hereinafter, multiple embodiments of a motor control device will be described with reference to the accompanying drawings. Substantially the same configurations in the multiple embodiments and substantially the same steps in the flowchart as each other are denoted by identical symbols or step symbols, and their description will be omitted. A motor control device according to the present embodiment controls energization of a three-phase AC motor used as a steering assist motor for assisting steering of a driver in an electric power steering system of a vehicle.

First Embodiment

Figure 1:
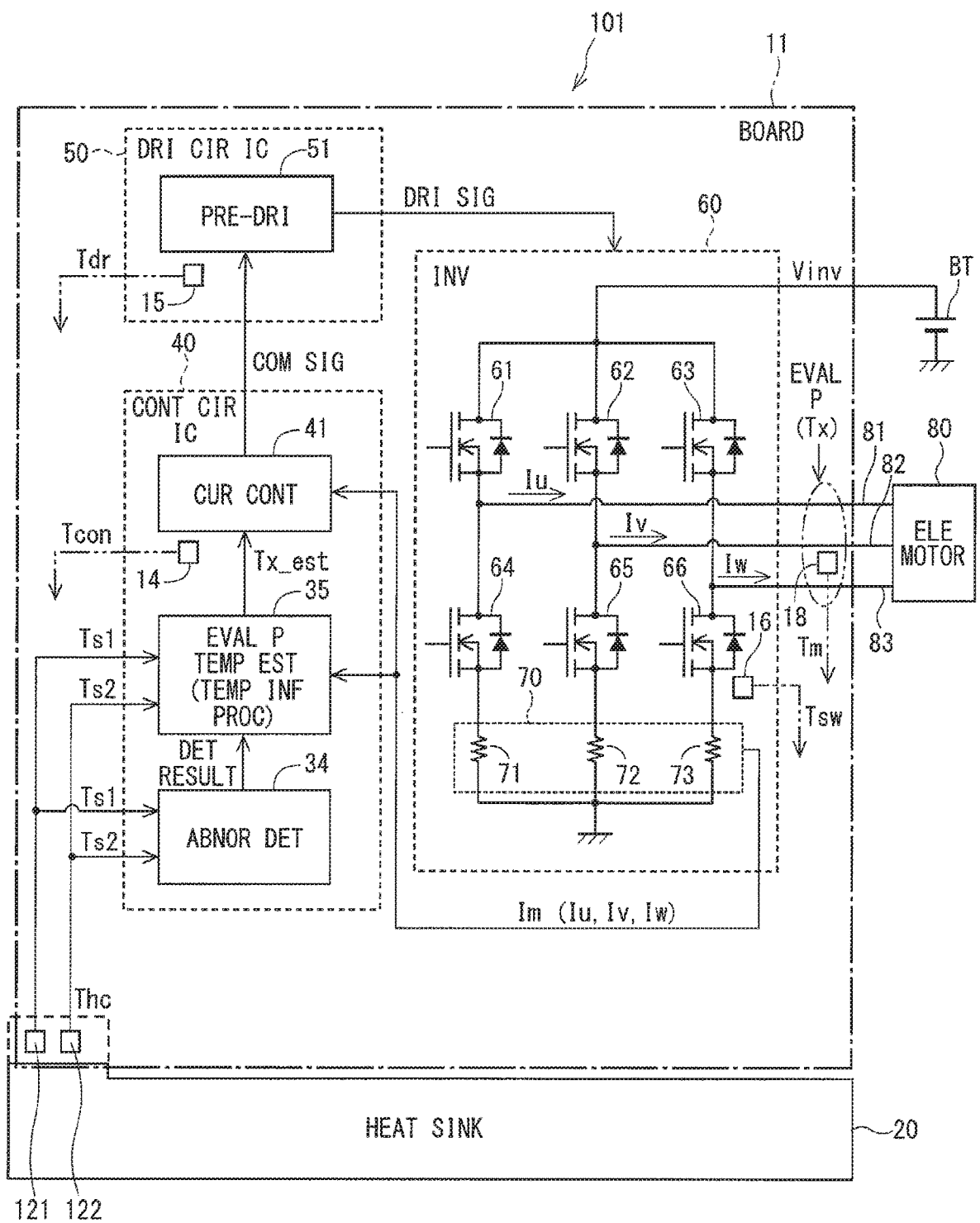
FIG. 1 is an overall configuration diagram of a motor control device according to a first embodiment.
Figure 4:
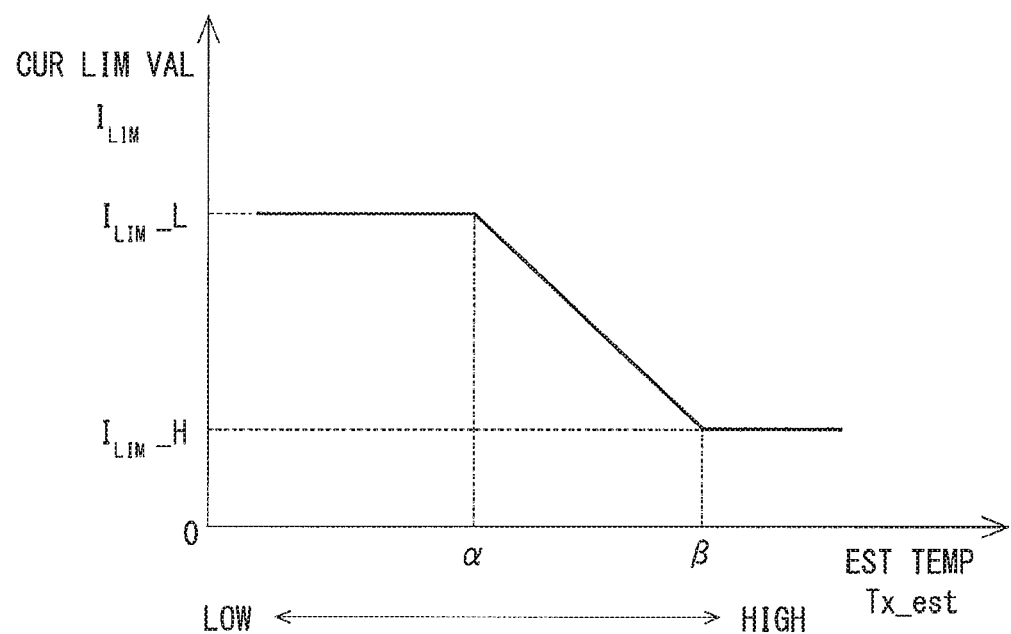
FIG. 4 is a map showing a relationship between an estimated temperature of an evaluation portion and the current limit value.

A motor control device according to a first embodiment will be described with reference to FIGS. 1 to 14. JP-A-2017-73898 is referred to as "Patent Literature 2". Patent Literature 2 is not described in the "Background Art" column, but is cited only in a description of the embodiments. FIG. 1 of the present embodiment adds a partial configuration to FIG. 1 of Patent Literature 2. FIGS. 2 to 4 correspond to FIGS. 2 to 4 of Patent Literature 2, and FIG. 5 corresponds to FIG. 8 of Patent Literature 2. The description of the contents common to Patent Literature 2 will be omitted as appropriate.

A motor control device 101 is basically configured by electronic components mounted on a board 11. In other words, a battery BT, an electric motor 80 and a heat sink 20 are not included in the motor control device 101. The motor control device 101 includes a control circuit IC 40, a drive circuit IC 50, multiple switching elements 61 to 66 forming an inverter 60 as a "power converter", and at least two temperature sensors. In addition, the motor control device 101 includes an abnormality determination unit 34 and an evaluation portion temperature estimation unit 35 as a "temperature information processing unit". The abnormality determination unit 34 and the evaluation portion temperature estimation unit 35 may be included in, for example, the control circuit IC 40 or in an IC separate from the control circuit IC 40.

The control circuit IC 40 and the drive circuit IC 50 are mounted on the board 11 in the form of an IC package. The control circuit IC 40 includes a current control unit 41 that calculates a command signal related to energization based on a torque command to the electric motor 80. The control circuit IC 40 is typically configured by a microcomputer. The drive circuit IC 50 includes a pre-driver 51 that outputs a drive signal to the multiple switching elements 61 to 66 of the inverter 60 based on the command signal calculated by the current control unit 41. The drive circuit IC 50 is used, for example, in the form of a customized ASIC.

In the inverter 60, six switching elements 61 to 66 mounted on the board 11 are bridge-connected to each other. An input unit of the inverter 60 is applied with an applied voltage Vinv from the battery BT. The inverter 60 converts a DC power into an AC power by operating the switching elements 61 to 66 of respective phases according to a drive signal from the pre-driver 51, and supplies phase currents Iu, Iv, and Iw to respective phase windings 81, 82, and 83. As a result, the electric motor 80 is driven to output a torque corresponding to a torque command.

Shunt resistors 71, 72, and 73 for detecting the phase currents Iu, Iv, and Iw are provided between the low-potential side switching elements 64, 65, and 66 of each phase and the ground. The respective shunt resistors 71, 72, and 73 are collectively referred to as a current sensor 70. The current sensor 70 may be provided in a current path from the inverter 60 to the windings 81, 82, and 83. In addition, current that flows through the electric motor 80 with the inclusion of the phase currents Iu, Iv and Iw of a fixed coordinate system and dq-axis currents Id and Iq of a rotating coordinate system is collectively referred to as "electric motor current Im".

In particular, the switching elements 61 to 66 and a power current path on the board 11 generate heat as the electric motor 80 is energized by the switching operation of the inverter 60. The generated heat is transmitted to the board 11, and the temperature of the control circuit IC 40 and the drive circuit IC 50 also rises. When the heat generation becomes excessive, there is a possibility that the electronic elements including the switching elements 61 to 66 may break down. Therefore, the board 11 is installed so as to radiate heat generated at the time of energization to the heat sink 20 such as an aluminum housing. For example, a ground path of the board 11 is attached so as to be in contact with the heat sink 20.

The evaluation portion temperature estimation unit 35 as the "temperature information processing unit" performs a predetermined process with the use of at least one of the detected temperatures of the two temperature sensors installed on the board 11. Hereinafter, the two temperature sensors that output the detected temperatures used for the processing of the evaluation portion temperature estimation unit 35 will be referred to as "first temperature sensor" and "second temperature sensor". Further, the detected temperature of the first temperature sensor is referred to as "first detected temperature Ts1", and the detected temperature of the second temperature sensor is referred to as "second detected temperature Ts2".

As an installation example of the first temperature sensor and the second temperature sensor, multiple temperature sensors 121, 122, 14, 15, 16, and 18 are shown at several places of the board 11 in FIG. 1. Not all of those temperature sensors are installed on the board 11, but two temperature sensors may be installed at any one or two of the several places. The two temperature sensors may be installed at two different places or may be installed at the same place side by side as with the temperature sensors 121 and 122. The temperature sensor is typically formed of a thermistor.

The roles and the installation form of the temperature sensors installed at the respective places will be described in order. The temperature sensors 121 and 122 detect a temperature Ths of the heat sink 20. In an example of FIG. 1, the temperature sensors 121 and 122 are installed on a ground path portion on the board 11 that is in contact with the heat sink 20. The temperature sensor 14 detects a temperature Tcon of the control circuit IC 40. The temperature sensor 15 detects a temperature Tdr of the drive circuit IC 50.

Figure 2A:
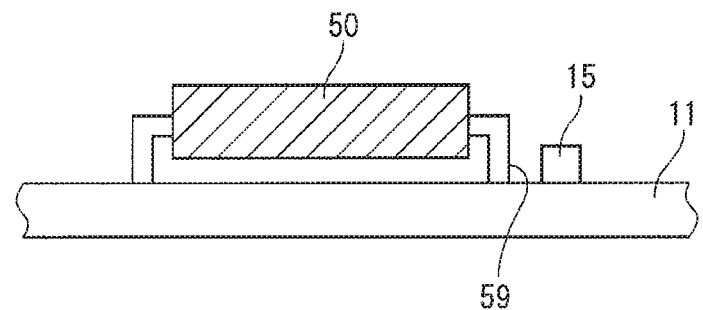
FIG. 2A is a schematic diagram showing a configuration in which a temperature sensor is installed on a board and FIG. 2B is a schematic diagram showing a configuration in which the temperature sensor is installed inside an IC package.
Figure 2B:
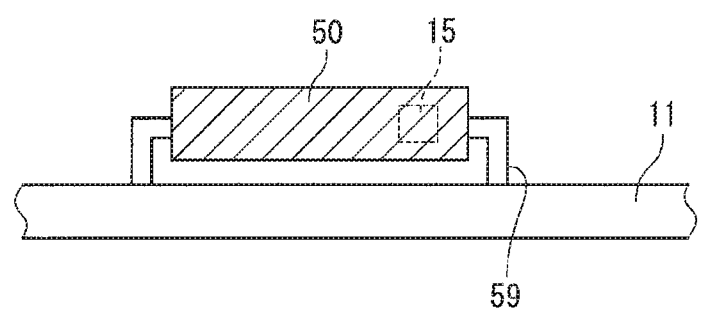
Figure 3:
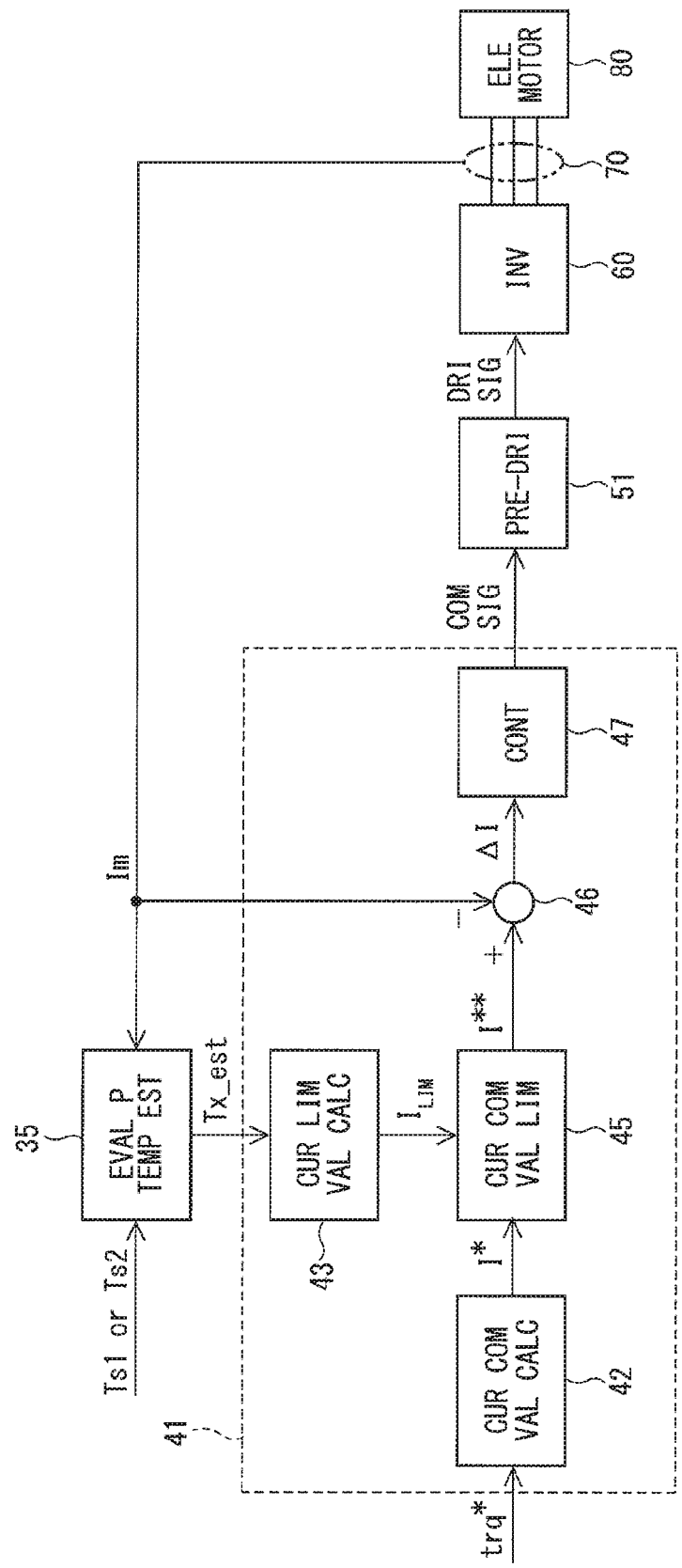
FIG. 3 is an overall control block diagram of the motor control device according to the first embodiment.

As shown in FIG. 2A, the temperature sensor 15 may be disposed on the board 11 in the vicinity of a lead portion 59 of the drive circuit IC 50 as a representative of the drive circuit IC 50. In addition, as shown in FIG. 2B, when the temperature sensor 15 is provided in an IC package, the temperature sensor 15 can be prevented from falling off when a bending stress acts on the board 11 or the like. Therefore, the temperature sensor 14 and the temperature sensor 15 are preferably provided inside the IC package.

The temperature sensor 16 detects a temperature Tsw of the switching elements 61 to 66. Assuming that switching heat generations of the upper and lower arms of each phase are equal to each other, for example, the temperature sensor 16 is installed in the vicinity of any of the representative switching elements. For example, in a configuration in which the multiple switching elements 61 to 66 are modularized and embedded in the IC package, the temperature sensor 16 is preferably provided inside the IC package. Further, in a configuration having a temperature sensitive diode inside the switching element, the temperature sensitive diode may be used as the temperature sensor. The temperature sensor 18 detects a temperature Tm of the electric motor 80. In the example of FIG. 1, the temperature sensor 18 is installed in the vicinity of a current path on the board 11 connected to the respective phase windings 81, 82, and 83.

As described above, the first temperature sensor and the second temperature sensor detect the temperature of any one or two of the heat sink 20, the board 11, the control circuit IC 40, the drive circuit IC 50, the switching elements 61 to 66, and the electric motor 80. However, it is preferable that at least one of the first temperature sensor and the second temperature sensor is provided on the board 11 that is in contact with the heat sink 20.

In FIG. 1, it is assumed that the temperature sensors 121 and 122 for detecting the temperature Ths of the heat sink 20 are the first temperature sensor and the second temperature sensor, and a first detected temperature Ts1 and a second detected temperature Ts2 are input to the abnormality determination unit 34 and the evaluation portion temperature estimation unit 35. In the case where the temperature sensors 14, 15, 16, and 18 are installed in other places, as indicated by a two-dot chain line, the detected temperatures of the respective temperature sensors are selectively input to the abnormality determination unit 34 and the evaluation portion temperature estimation unit 35.

The evaluation portion temperature estimation unit 35 estimates a temperature Tx of one or more "evaluation portions" as a predetermined process to be performed by using at least one of the detected temperatures Ts1 and Ts2 and the electric motor current Im. The evaluation portion is selected from the heat sink 20, the control circuit IC 40, the drive circuit IC 50, the switching elements 61 to 66, and the electric motor 80. FIG. 1 shows an example of estimating the temperature of the electric motor 80 as the evaluation portion.

Specifically, the evaluation portion temperature estimation unit 35 estimates a rising temperature of the evaluation portion based on a square integration value of an electric motor current Im and adds the estimated rising temperature to the acquired detected temperature. Further, the evaluation portion temperature estimation unit 35 estimates a temperature Tx of the evaluation portion by performing a correction according to a distance from the heat generation unit at the time of energization, a difference in a heat radiation characteristic, an elapsed time from an energization stop, and so on. An estimated temperature Tx_est estimated by the evaluation portion temperature estimation unit 35 is output to the current control unit 41. Incidentally, the estimation of the rising temperature is not limited to the configuration using the electric motor current Im detected by the current sensor 70, and, for example, the rising temperature may be estimated based on an inverter applied voltage Vinv correlated with the electric motor current Im. The "estimated based on the current flowing through the electric motor" is interpreted as including the above case.

Next, the overall control configuration of the motor control device 101 will be described with reference to FIG. 3. The current control unit 41 includes a current command value computation unit 42, a current limit value computation unit 43, a current command value limit unit 45, a subtractor 46, a controller 47, and the like. The current command value computation unit 42 calculates a current command value I* based on a torque command trq* which is an "output command to the electric motor 80".

The current limit value computation unit 43 calculates a current limit value $I_{LIM}$ for a current command value I* based on the estimated temperature Tx_est of the evaluation portion estimated by the evaluation portion temperature estimation unit 35. For example, a map defining a relationship between the estimated temperature Tx_est and the current limit value $I_{LIM}$ as shown in FIG. 4 is used. The current control unit 41 sets the current limit value $I_{LIM}$ to be lower as the estimated temperature Tx_est is higher in a range of the estimated temperature Tx_est from a lower temperature α to a higher temperature β. For example, when the estimated temperature Tx_est is equal to or lower than the temperature α, the current control unit 41 sets a current limit value $I_{LIM}$_L for low temperature, and when the estimated temperature Tx_est is equal to or higher than the temperature β, the current control unit 41 sets a current limit value $I_{LIM}$_H for high temperature.

According to the above map, when the estimated temperature Tx_est of the evaluation portion is equal to or lower than the temperature α, it is determined that a heat resistance of the element is not affected, and an output of the electric motor 80 is improved without limiting the current command value I* as much as possible. On the other hand, when the estimated temperature Tx_est of the evaluation portion exceeds the temperature α, it is determined that there is a possibility that the heat resistance of the element is affected, and the current command value I* is limited to a low level to prevent the element from failing. However, when the current limit value $I_{LIM}$ is reduced to near zero, the driving of the electric motor 80 is substantially stopped. In the present embodiment, priority is given to continuing driving of the electric motor 80 even the output is low, and when the estimated temperature Tx_est of the evaluation portion is equal to or higher than the temperature β, the necessary minimum current limit value $I_{LIM}$_H is set.

The current command value limit unit 45 limits the current command value I* by the current limit value $I_{LIM}$ and outputs the current command value I after the limitation. The subtractor 46 calculates a current deviation ΔI between the electric motor current Im detected by the current sensor 70 and the limited current command value I.

The controller 47 calculates a command signal such as a voltage command by PI control computation or the like so that the current deviation ΔI approaches zero. The command signal calculated by the current control unit 41 in this way is output to the pre-driver 51.

Figure 5:
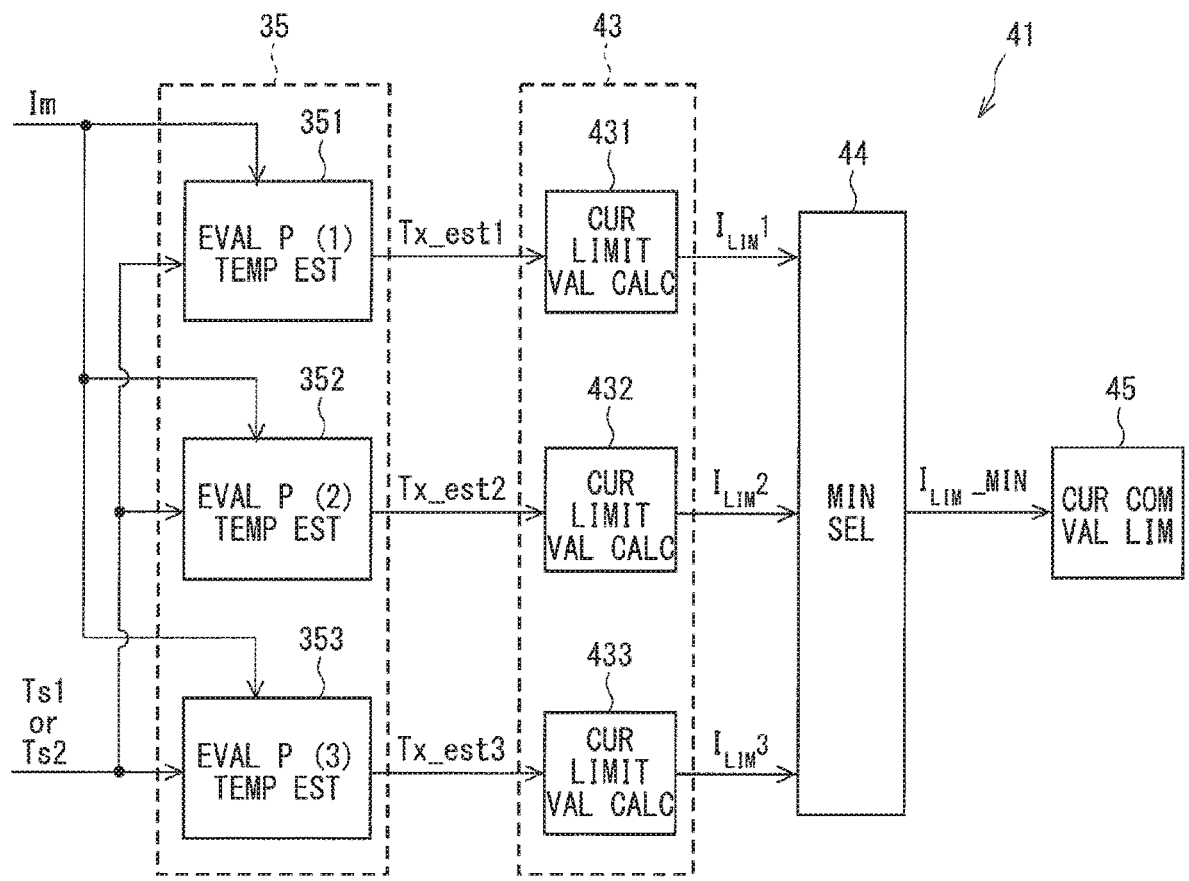
FIG. 5 is a configuration diagram for limiting a current command value with the use of a minimum value of multiple current limit values set for each of multiple evaluation portion estimated temperatures.

Next, the configuration in which the evaluation portion temperature estimation unit 35 estimates the temperatures of the multiple evaluation portions will be described with reference to FIG. 5. The evaluation portion temperature estimation unit 35 includes evaluation portion temperature estimation units 351, 352, and 353 that estimate the temperatures of the three evaluation portions (1), (2), and (3). The current control unit 41 further includes a MIN selection unit 44 between the current limit value computation unit 43 and the current command value limit unit 45 in FIG. 3.

As a result of the temperature sensor abnormality determination by the abnormality determination unit 34, the respective evaluation portion temperature estimation units 351, 352, and 353 acquire the first detected temperature Ts1 or the second detection temperature Ts2 determined to be used and the electric motor current Im commonly. The respective evaluation portion temperature estimation units 351, 352, and 353 estimate temperatures Tx_est1, Tx_est2, and Tx_est3 of the respective evaluation portions (1), (2), and (3) based on those pieces of information.

The current limit value computation unit 43 of the current control unit 41 includes current limit value computation units 431, 432, and 433 corresponding to the evaluation portion temperature estimation units 351, 352, and 353. The respective current limit value computation units 431, 432, and 433 set current limit values $I_{LIM}1$, $I_{LIM}2$, and $I_{LIM}3$ corresponding to the estimated temperatures Tx_est1, Tx_est2, and Tx_est3 by a map or the like, and output the set current limit values to the MIN selection unit 44. At that time, maps different for the respective evaluation portions may be used. The MIN selection unit 44 selects a minimum value $I_{LIM\_}$MIN among the current limit values $I_{LIM}1$, $I_{LIM}2$, and $I_{LIM}3$, and outputs the selected minimum value $I_{LIM\_}$MIN to the current limit value computation unit 45. The current limit value computation unit 45 limits the current command value I* by the minimum value $I_{LIM\_}$MIN of the current limit value.

The current command value I* is limited based on the estimated temperatures of the multiple evaluation portions, thereby being capable of reflecting temperature information on each portion of the motor driving system in a reduction of the heat generation accompanying energization. From the viewpoint of giving priority to fail-safe, since the current command value I* is limited by the minimum value $I_{LIM\_}$MIN of the current limit value, the element failure caused by the heat generation can be more properly prevented.

Meanwhile, in order to ensure the reliability of the processing to be executed by the evaluation portion temperature estimation unit 35, it is assumed that the first temperature sensor and the second temperature sensor are normal. Therefore, the abnormality determination unit 34 determines whether there is the abnormality in the first temperature sensor and the second temperature sensor, or not, based on the detected temperatures Ts1, Ts2, and so on of the two temperature sensors. The temperature used for processing by the evaluation portion temperature estimation unit 35 is selected from the detected temperatures Ts1 and Ts2 based on the temperature sensor abnormal state determined by the abnormality determination unit 34. Details of the abnormality determination by the abnormality determination unit 34 will be described later.

Next, referring to FIG. 6, an overall flow in which the abnormality determination unit 34 determines whether the temperature sensor is in an abnormal state, or not, will be described. In the present embodiment, it is determined whether the temperature sensor is in the abnormal state, or not, according to the Hi/Lo sticking determination, the excessive change amount determination, and the intermediate value fixation determination. The temperature sensor abnormal state includes five modes: (1) that both of the first and second temperature sensors are normal, (2) that the first temperature sensor is abnormal, (3) that the second temperature sensor is abnormal, (4) that both of the first and second temperature sensors are abnormal, and (5) outside of the normal range.

In the present specification, "outside of the normal range" means a state in which the first detected temperature Ts1 and the second detected temperature Ts2 deviate from each other beyond the normal deviation threshold and which temperature sensor is abnormal cannot be identified. In an example of FIG. 6, it may be determined that the temperature deviation is outside the normal range in the intermediate value fixation determination. In addition, it may be determined that the temperature deviation is outside the normal range also in an intermediate offset determination or the like which will be described later.

For example, in the conventional art disclosed in Patent Literature 1 (JP-A-2004-82757), it is determined whether there is a failure in the two temperature sensors, or not, individually. However, in the conventional art, although the two temperature sensors are not individually determined to be abnormal, an abnormality in which the detected temperatures of the two temperature sensors deviate from each other beyond the normal deviation threshold is not mentioned. On the other hand, in the present embodiment, the abnormal state of the temperature sensors is determined in a wider range including the case where the detected temperatures of the two temperature sensors deviate from each other beyond the normal deviation threshold. Further, it is an object of the present disclosure to make it possible to more appropriately select the detected temperature to be used for the processing by the evaluation portion temperature estimation unit 35 as the "temperature information processing unit".

Figure 6:
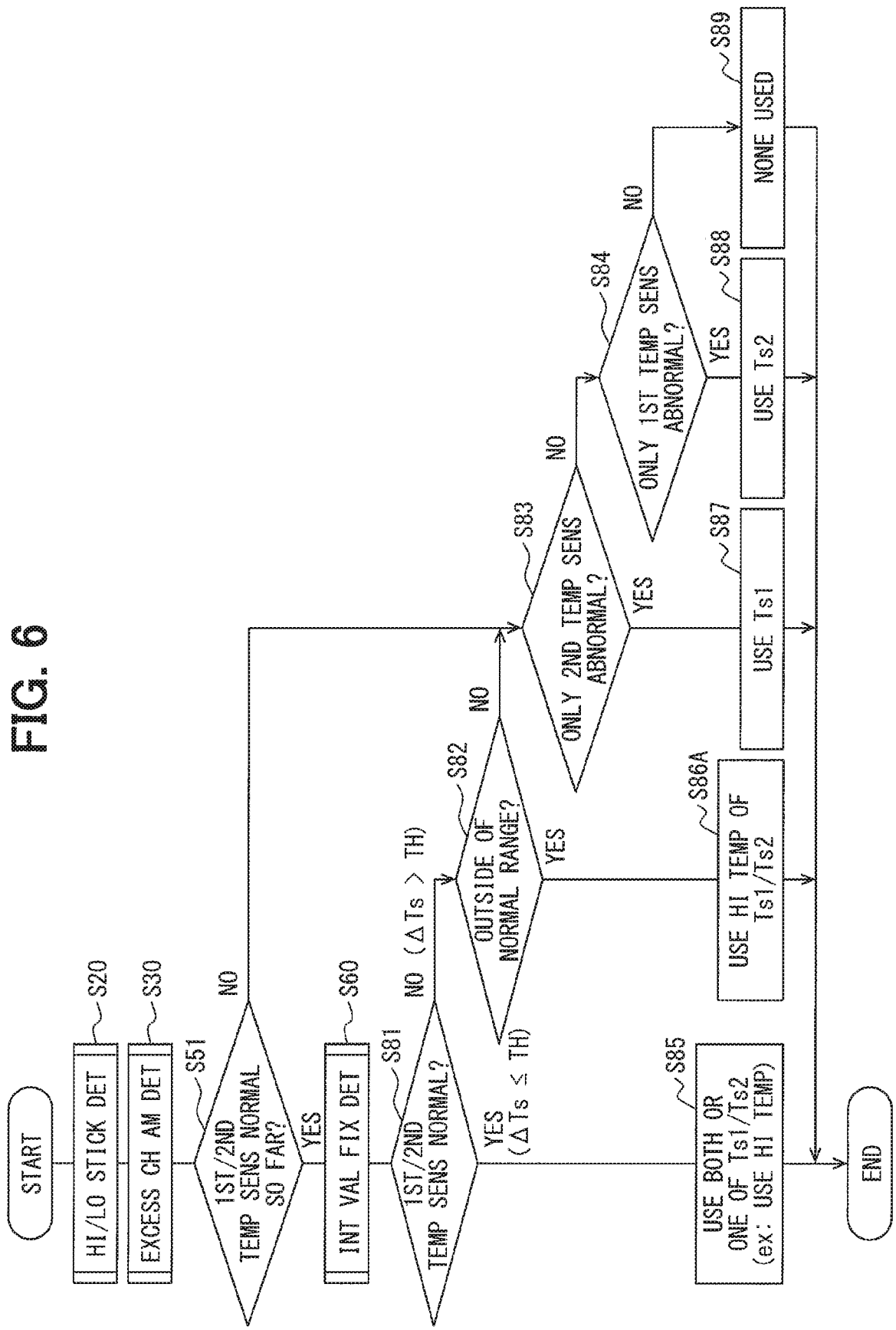
FIG. 6 is an overall flowchart of a temperature sensor abnormal state determination process according to the first embodiment.

In the description of flowcharts in FIG. 6 and subsequent figures, a symbol "S" represents a step. Further, in S20, S30, and S60 of FIG. 6, detailed processes are described in flowcharts to be described later. Among those processes, in the processes in which multiple substitutable examples exist, symbols A to D are added to an end of step number. Further, S86A in FIG. 6 means that S86A can be substituted for FIG. 86B to be described later.

The abnormality determination unit 34 performs the Hi/Lo sticking determination in S20 and performs the excessive change amount determination in S30. In those two determinations, the abnormality determination unit 34 can determine whether there is abnormality for each of the temperature sensors, or not. If both of the first and second temperature sensors are normal in the steps so far, the determination in S51 is YES, and the process proceeds to S60. If one or both of the temperature sensors have already been determined to be abnormal, the process goes to S83. If only the second temperature sensor is abnormal, the determination in S83 is YES. If only the first temperature sensor is abnormal, the determination in S83 is NO and the determination in S84 is YES. If both of the first and second temperature sensors are abnormal, the determination in S 84 is NO.

In the intermediate value fixation determination in S60, a temperature deviation ΔTs (=|Ts1−Ts2|) between the first detected temperature Ts1 and the second detected temperature Ts2 is compared with a threshold. If the temperature deviation ΔTs is equal to or less than the threshold, both of the first and second temperature sensors are normal, and the determination in S81 is YES. If the temperature deviation ΔTs exceeds the threshold, the determination in S81 is NO. At that time, if it can be identified which of the temperature sensors is abnormal, the determination in S82 is NO, and the process proceeds to S83. If it cannot be identified which of the temperature sensors is abnormal, the determination in S82 is YES as "outside of the normal range".

The detected temperature to be used for the process of estimating the evaluation portion temperature by the evaluation portion temperature estimation unit 35 is selected based on the determination result of the temperature sensor abnormal state by the abnormality determination unit 34. If the determination in S81 is YES, both or one of the detected temperatures Ts1 and Ts2 is used in S85. In the case where both of the detected temperatures Ts1 and Ts2 are used, for example, a simple average value or a weighted average value may be used. If one of those detected temperatures is used, for example, the higher temperature which is a safe side in setting the current limit value may be selected. Alternatively, one detected temperature may be preferentially used.

If the determination in S82 is YES, the higher one of the detected temperatures Ts1 and Ts2 of the two temperature sensors any one of which is unknown as normal is used in S86A. In other words, according to the first embodiment, the higher temperature corresponds to "a temperature that meets a predefined condition". As a result, the current limit value is set to the safe side in the current control unit 41. If the determination in S83 is YES, the detected temperature Ts1 of the normal first temperature sensor is used in S87. If the determination in S84 is YES, the detected temperature Ts2 of the normal second temperature sensor is used in S 88. If the determination in S 84 is NO, none of the detected temperatures is used in S89. In that case, the motor control device 101 performs an abnormality treatment such as stopping the electric motor drive.

Subsequently, details of the Hi/Lo sticking determination in S20, the excessive change amount determination in S30, and the intermediate value fixation determination in S60 will be sequentially described. In the first embodiment, one example is described for each of those determinations, another example of the intermediate value sticking determination will be described in a second embodiment, and other examples of the excessive change amount determination will be described in third to fifth embodiments. It should be noted that the Hi/Lo sticking determination is described in only an example of the first embodiment.

In the following description of each determination, for example, the detected temperatures Ts1 and Ts2 per se are used as the evaluation amounts to be compared with the threshold. In general, however, the detected temperature is a converted value of a voltage value output from the temperature sensor, and a voltage value before being converted may be used as the evaluation amount. Therefore, "an output of the temperature sensor or the detected temperature converted from the output" is set to "detected temperature equivalent amount". In general terms, the abnormality determination unit 34 determines whether the first temperature sensor and the second temperature sensor are abnormal, or not, based on the detected temperature equivalent amounts of the first temperature sensor and the second temperature sensor. For example, when the determination is performed based on the voltage value as the detected temperature equivalent amount, a term " temperature" used for determination in the following embodiment may be interpreted as " temperature equivalent voltage" as appropriate.

In addition, each of the following determination processes is basically repeatedly executed in a predetermined determination cycle. In this example, in consideration of the responsiveness of a temperature change, a follow-up capability of the control circuit and the like, a determination time for determining each state may be set. Incidentally, in parts of the description of the specification corresponding to a flowchart for each determination where the same phrases are repeated, the description of terms will be omitted as appropriate and only symbols will be used such that, for example, "lower limit temperature threshold Tth_Lo" is expressed as "Tth_Lo".

The Hi/Lo sticking determination will be described with reference to time charts of FIGS. 7A to 7C and a flowchart of FIG. 8. As shown in FIG. 7A, when both of the first temperature sensor and the second temperature sensor are normal, the first detected temperature Ts1 and the second detected temperature Ts2 transition between a lower limit temperature threshold Tth_Lo and an upper limit temperature threshold Tth_Hi in the same manner. The first detected temperature Ts1 and the second detected temperature Ts2 are substantially equal to each other, and the temperature deviation ΔTs is close to 0.

As shown in FIG. 7B, when the second temperature sensor is fixed to Hi at a time t0, the second detected temperature Ts2 thereafter exceeds the upper limit temperature threshold Tth_Hi. Further, as shown in FIG. 7C, when the second temperature sensor is fixed to Lo at the time t0, the second detected temperature Ts2 subsequently falls below the lower limit temperature threshold Tth_Lo. In those cases, the abnormality determination unit 34 determines that the second temperature sensor is Hi fixation abnormal or Lo fixation abnormal.

In S21 of FIG. 8, the abnormality determination unit 34 acquires the first detected temperature Ts1 and the second detected temperature Ts2. In S23 to S25, the abnormality determination unit 34 determines whether the respective detected temperatures Ts1 and Ts2 are equal to or more than the lower limit temperature threshold value Tth_Lo and equal to or less than the upper limit temperature threshold value Tth_Hi, or not. If both of Ts1 and Ts2 are "Tth_Lo or more and Tth_Hi or less", the determination in S23 is YES, and it is determined that both of the first and second temperature sensors are normal in S26.

When Ts1 is "Tth_Lo or more and Tth_Hi or less" and Ts2 is "lower than Tth_Lo or higher than Tth_Hi", the determination in S23 is NO, the determination in S 24 is YES, and the second temperature sensor is determined to be abnormal in S27. When Ts2 is "Tth_Lo or more and Tth_Hi or less" and Ts1 is "lower than Tth_Lo or higher than Tth_Hi", the determination in S24 is NO, the determination in S25 is YES, and the first temperature sensor is determined to be abnormal in S28. If the determination in S25 is NO, it is determined that both of the first and second temperature sensors are abnormal in S29.

Figure 9:
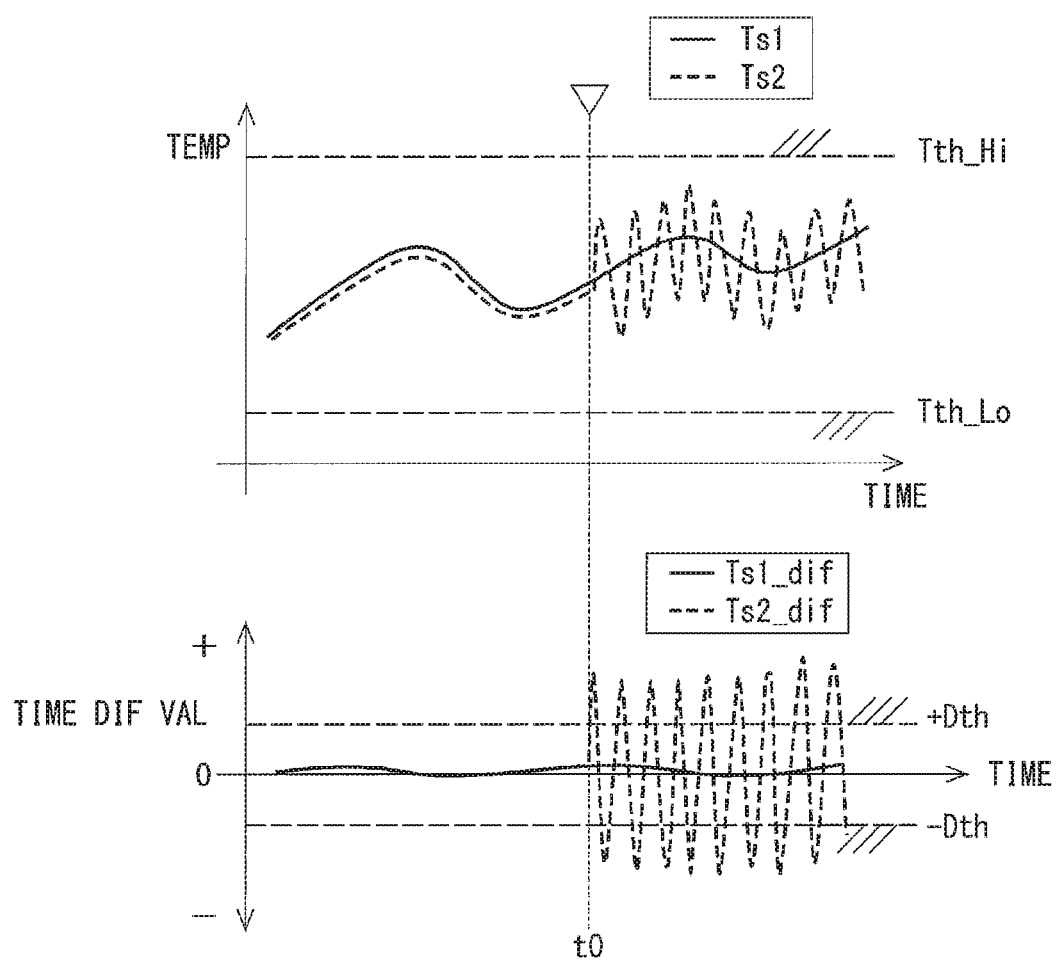
FIG. 9 is a time chart of an excessive change amount abnormality.
Figure 10:
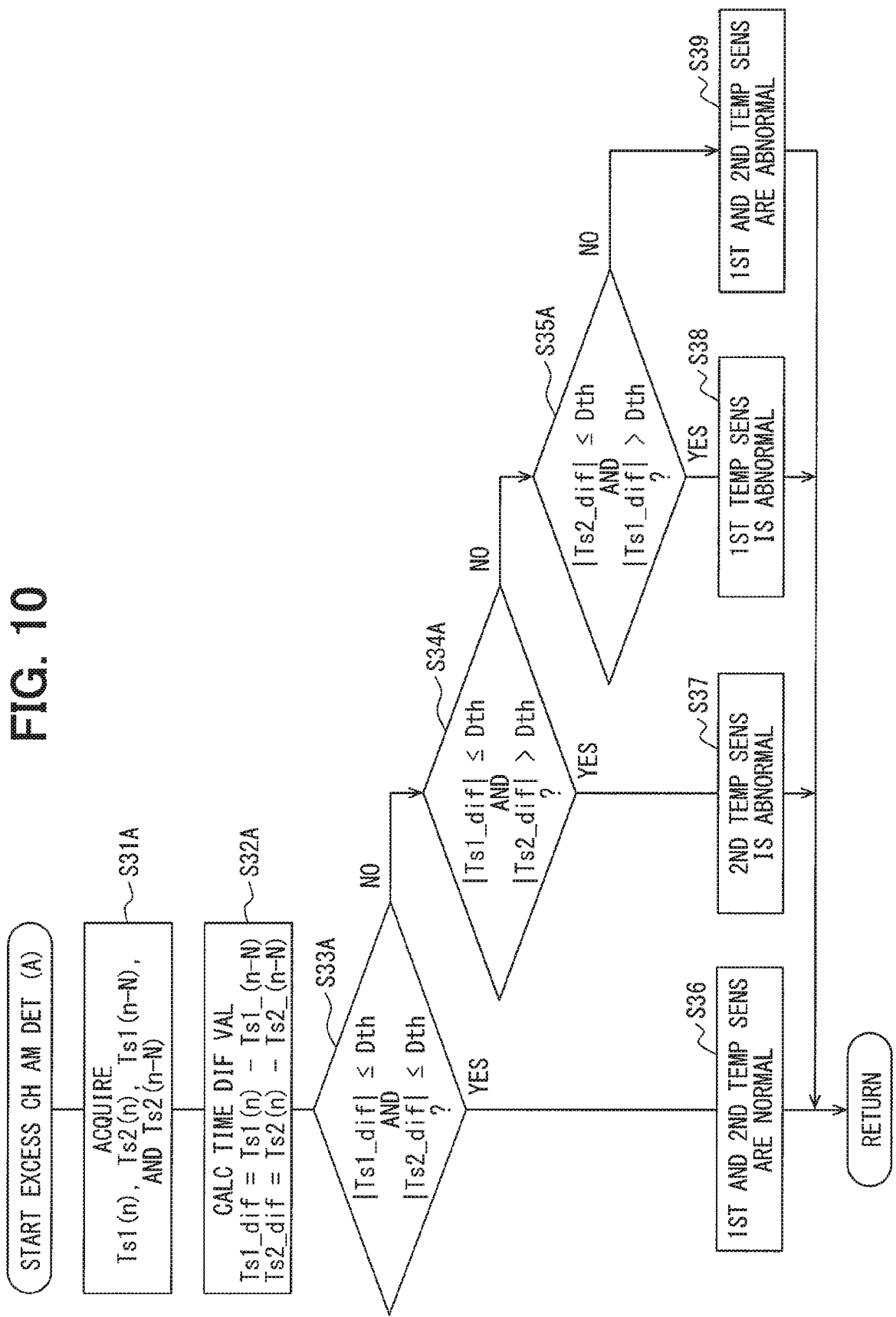
FIG. 10 is a flowchart of the excessive change amount determination (A) according to the first embodiment.

Next, the excessive change amount determination will be described with reference to a time chart of FIG. 9 and a flowchart of FIG. 10. FIG. 9 shows the detected temperatures Ts1 and Ts2 of the respective temperature sensors and time differential values Ts1_dif and Ts2_dif of the detected temperatures Ts1 and Ts2. The first detected temperature Ts1 normally transitions between a lower limit temperature threshold Tth_Lo and an upper limit temperature threshold Tth_Hi. Although the second detected temperature Ts2 is abnormally varied with a high frequency waveform after the time t0, since the second detected temperature Ts2 changes between the lower limit temperature threshold Tth_Lo and the upper limit temperature threshold Tth_Hi, and therefore no abnormality is detected in the Hi/Lo sticking determination.

Therefore, paying attention to the differential values of the detected temperatures, that is, the amount of change per unit time, since the detected temperatures change slowly in a normal period before the time t0, the differential values Ts1_dif and Ts2_dif transition around 0. However, after the time t0, the differential value Ts2_dif of the second detected temperature has a positive side peak exceeding a positive differential threshold +Dth and a negative side peak falling below a negative differential threshold −Dth. At that time, the abnormality determination unit 34 determines that the second temperature sensor is abnormal with the excessive change amount abnormality.

In S31A of FIG. 10, the abnormality determination unit 34 acquires current values Ts1($n$) and Ts2($n$) of the first and second detected temperatures and values Ts1($n$−N) and Ts2($n$−N) sampled at an Nth time (hereinafter, N is an arbitral integer). In S32A, the time differential values Ts1_dif and Ts2_dif of the respective detected temperatures are calculated by the following expressions.

$$Ts1\_dif = Ts1(n) - Ts1(n-N)$$

$$Ts2\_dif = Ts2(n) - Ts2(n-N)$$

In S33A to S35A, it is determined whether absolute values |Ts1_dif| and |Ts2_dif| of the respective differential values are equal to or less than a differential threshold Dth, or not. If both of |Ts1_dif| and |Ts2_dif| are equal to or less than Dth, the determination in S33A is YES, and it is determined in S36 that both of the first and second temperature sensors are normal.

If |Ts1_dif| is equal to or less than Dth and |Ts2_dif| is larger than Dth, the determination in S33A is NO and the determination in S 34A is YES, and the second temperature sensor is determined to be abnormal in S37. When |Ts2_dif| is equal to or less than Dth and |Ts1_dif| is more than Dth, the determination in S34A is NO and the determination in S35A is YES, and the first temperature sensor is determined to be abnormal in S38. If the determination in S35A is NO, it is determined that both of the first and second temperature sensors are abnormal in S39.

Instead of comparing the absolute values of the differential values with the common differential threshold Dth, positive and negative differential values may be compared with a positive differential threshold +Dth and a negative differential threshold −Dth. In that case, it is determined that the temperature sensor whose differential value is "−Dth or more and +Dth or less" is normal and the temperature sensor whose differential value is "less than −Dth or more than +Dth" is abnormal. Also, in the case where the determination time is provided, there are cases where a state in which the differential value is in the vicinity of the peak is hardly kept. Therefore, it may be determined that the temperature sensor is abnormal when the number of times the abnormality determination condition is satisfied in a predetermined period is equal to or more than a predetermined number.

Figure 11:
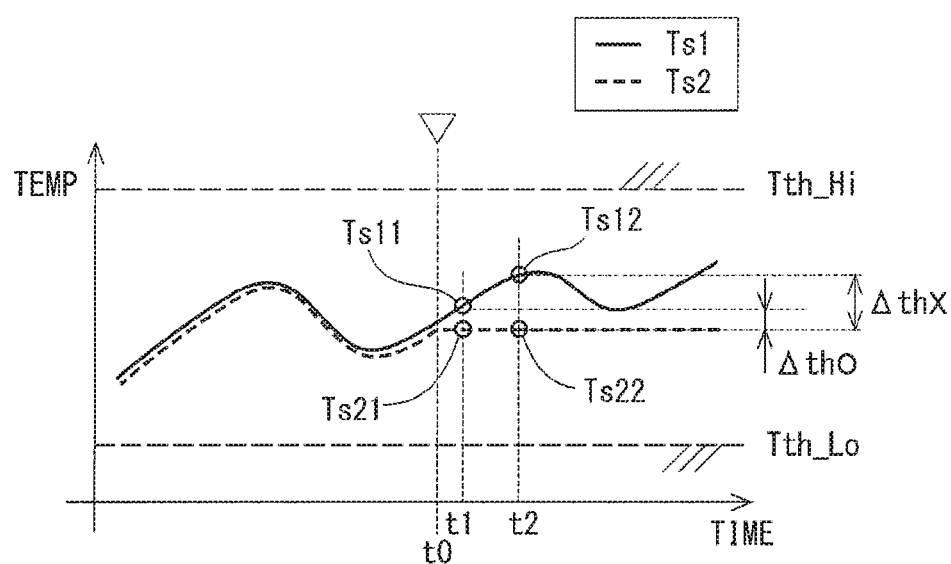
FIG. 11 is a time chart of an intermediate fixation abnormality.

Next, the intermediate value fixation determination will be described with reference to a time chart of FIG. 11 and a flowchart of FIG. 12. As shown in FIG. 11, the first detected temperature Ts1 normally transitions between a lower limit temperature threshold Tth_Lo and an upper limit temperature threshold Tth_Hi. After the time t0, the second detected temperature Ts2 is fixed at an intermediate value between the lower limit temperature threshold Tth_Lo and the upper limit temperature threshold Tth_Hi. Since a deviation between the first detected temperature Ts1 and the second detected temperature Ts2 becomes larger after the time t0, when the temperature deviation ΔTs exceeds a predetermined value at a certain point, it can be determined that any one of the temperature sensors is abnormal. However, it can be identified which temperature sensor is abnormal. In that case, attention is paid to the amount of change in each of the detected temperatures Ts1 and Ts2 in the present embodiment.

In this example, a normal deviation threshold ΔthO and a large deviation threshold ΔthX for determining the degree of deviation between the detected temperatures Ts1 and Ts2 are defined. When the temperature deviation ΔTs is equal to or less than the normal deviation threshold ΔthO, both of the first temperature sensor and the second temperature sensor are determined to be normal. When the temperature deviation ΔTs exceeds the normal deviation threshold ΔthO, it is determined that at least one of the temperature sensors is abnormal. The large deviation threshold ΔthX is set to a value larger than the normal deviation threshold ΔthO and is a value that determines an arrival time point of the temperature change amount calculation to be described next. Further, a state in which the temperature deviation ΔTs exceeds the normal deviation threshold ΔthO and it cannot be identified which temperature sensor is abnormal corresponds to "outside of the normal range".

After the time t0, the temperature deviation ΔTs gradually increases, exceeds the normal deviation threshold ΔthO at a time t1, and then reaches the large deviation threshold ΔthX at a time t2. In the present specification, the time t1 is defined as "holding time point", and the time t2 is defined as "arrival time point". The holding time point t1 is a time point immediately before the temperature deviation ΔTs deviates from the normal range and is a sampling time point one sample or more before the arrival time point t2. The abnormality determination unit 34 holds the first detected temperature and the second detected temperature at the holding time point t1 as a first detected temperature holding value Ts11 and a second detected temperature holding value Ts21, respectively. Further, the first detected temperature at the arrival time point t2 is defined as Ts12, and the second detected temperature is defined as Ts22.

Temperature change amounts δTs1 and δTs2 of the respective detected temperatures from the holding time point t1 to the arrival time point t2 are expressed by the following expressions. In the present specification, an uppercase letter "Δ" is used for the temperature deviation ΔTs between the two detected temperatures Ts1 and Ts2, and a lowercase letter "δ" is used for the temperature change amounts of the respective detected temperatures Ts1 and Ts2 for distinction.

$$\delta Ts1 = Ts12 - Ts11$$

$$\delta Ts2 = Ts22 - Ts21$$

When the second temperature sensor is fixed at an intermediate value, since the temperature change amount δTs2 of the second detected temperature satisfies δTs2≈0 the abnormality determination unit 34 can identify that the second temperature sensor is abnormal. It is to be noted that the holding time point t1 is not limited to a time point at which the temperature deviation ΔTs exceeds the normal deviation threshold ΔthO as in the above example. The holding time point t1 may be set at a sample time point a predetermined time or a predetermined number of sample times before the arrival time point t2.

Figure 12:
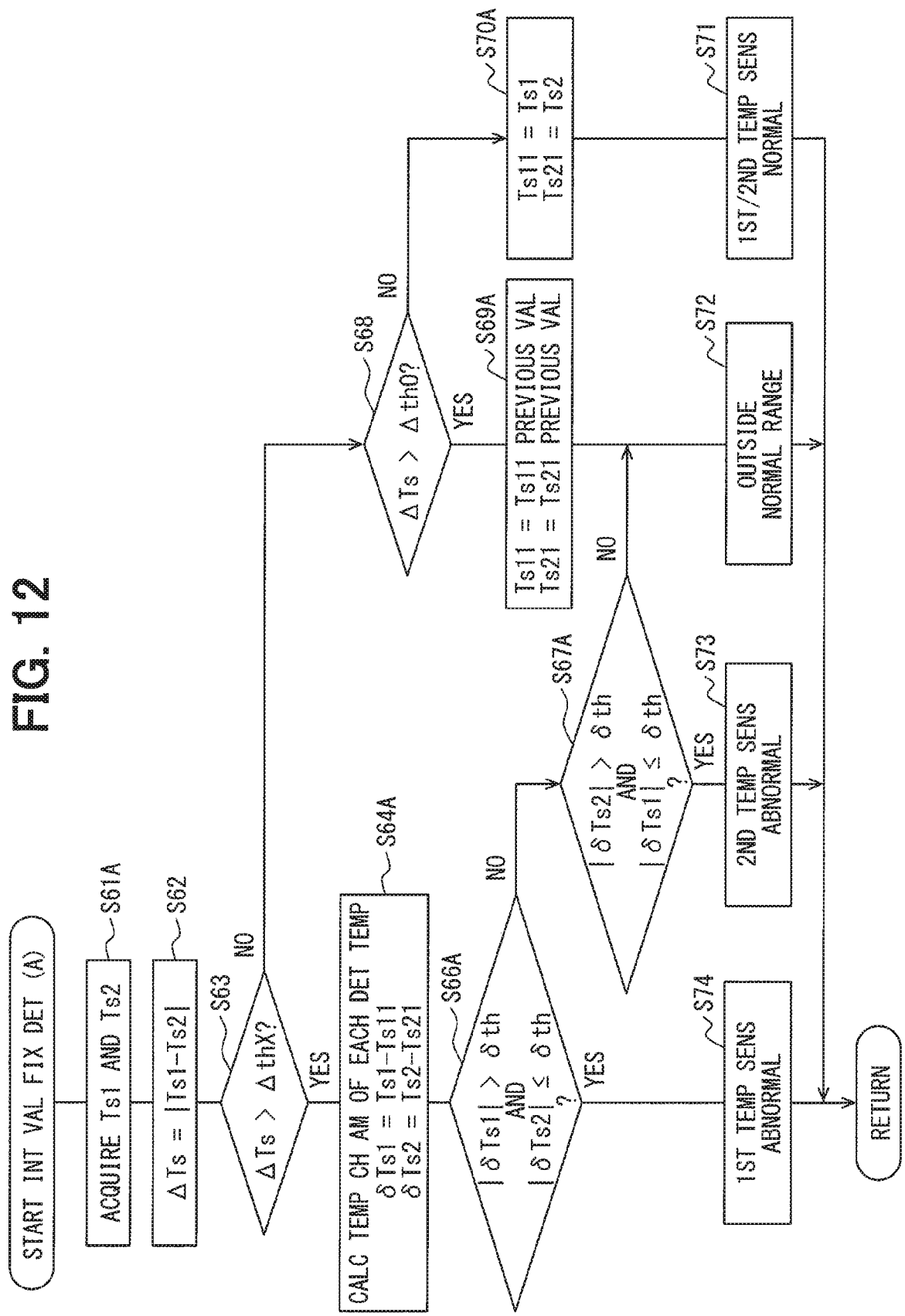
FIG. 12 is a flowchart of an intermediate value fixation determination (A) according to the first embodiment.

The abnormality determination unit 34 acquires the first detected temperature Ts1 and the second detected temperature Ts2 in S61A of FIG. 12, and calculates a temperature deviation ΔTs (=|Ts1−Ts2|) in S62. When the temperature deviation ΔTs is larger than the large deviation threshold ΔthX, the determination in S63 is YES and the process proceeds to S64A to calculate the temperature change amounts δTs1 and δTs2 of the respective detected temperatures. When the temperature deviation ΔTs is equal to or less than the large deviation threshold ΔthX, the determination in S63 is NO and the process proceeds to S68.

In S66A and S67A subsequent to S64A, absolute values |δTs1| and |δTs2| of the change amounts of the respective detected temperatures are compared with a change amount threshold δth. If |δTs1| is larger than δth and |δTs2| is δth or less, the determination in S66A is YES, and it is determined in S74 that the first temperature sensor is abnormal. If |δTs2| is larger than δth and |δTs1| is δth or less, the determination in S66A is NO, the determination in S67A is YES and it is determined in S73 that the second temperature sensor is abnormal. In the case of NO in S67A, that is, if it cannot be identified which temperature sensor is abnormal, it is determined in S72 that the temperature deviation is outside the normal range.

On the other hand, in the case of shifting to S68, since the detected temperatures Ts12 and Ts22 at a time t12 are not present, the temperature change amounts δTs1 and δTs2 are not calculated. When the temperature deviation ΔTs is more than the normal deviation threshold ΔthO, the determination in S68 is YES, and previous values of the respective detected temperature holding values Ts11 and Ts21 are updated as detected temperature holding values Ts11 and Ts21 in S69A. In addition, it is determined in S72 that the temperature deviation is outside the normal range.

When the temperature deviation ΔTs is equal to or less than the normal deviation threshold ΔthO, the determination in S68 is NO, and current values of the respective detected temperatures Ts1 and Ts2 are updated as detected temperature holding values Ts11 and Ts21 in S70A. It is determined that both of the first and second temperature sensors are normal in S71. S71 to S74 in FIG. 12 correspond to second digit in S81 to S84 in FIG. 6.

As described above, in the present embodiment, when the temperature deviation ΔTs exceeds the large deviation threshold ΔthX in the intermediate value fixation determination, it can be identified which sensor is abnormal based on the temperature change amounts δTs1 and δTs2 of the respective detected temperatures. Therefore, the intermediate value fixation abnormal state of the temperature sensors including the case of outside of the normal range can be appropriately identified.

The idea of the intermediate value fixation determination according to the present embodiment is not limited to the abnormality in which the detected temperatures Ts1 and Ts2 are fixed between the lower limit temperature threshold Tth_Lo and the upper limit temperature threshold Tth_Hi, but may be also applicable to the determination of the intermediate offset abnormality in which the detected temperatures Ts1 and Ts2 are offset. Subsequently, the intermediate offset determination will be described with reference to a time chart of FIG. 13 and a flowchart of FIG. 14.

Figure 13:
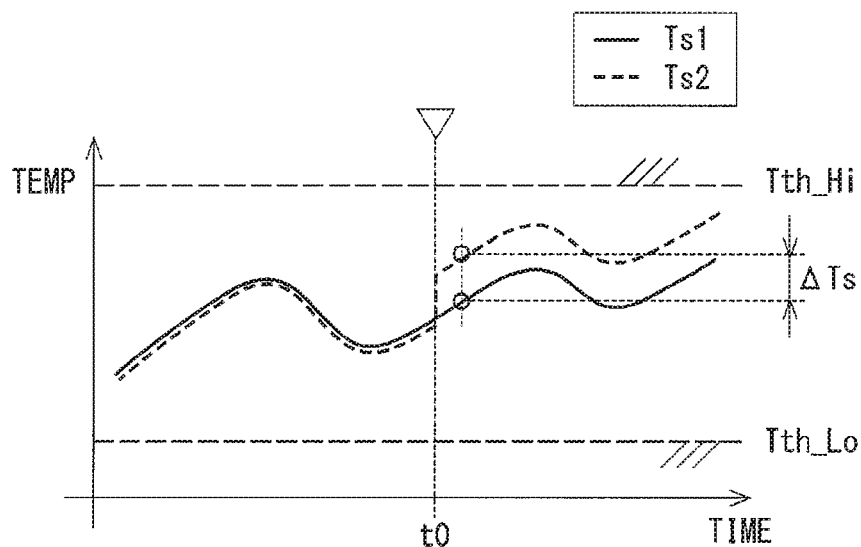
FIG. 13 is a time chart of an intermediate offset abnormality.

As shown in FIG. 13, the second detected temperature Ts2 is offset from the normal first detected temperature Ts1 between the lower limit temperature threshold Tth_Lo and the upper limit temperature threshold Tth_Hi after the time t0. When the temperature deviation ΔTs exceeds the normal deviation threshold ΔthO, it can be determined that any one of the temperature sensors is abnormal, but it cannot be identified which one of the temperature sensors is abnormal. That is, the state is "outside the normal range".

Figure 14:
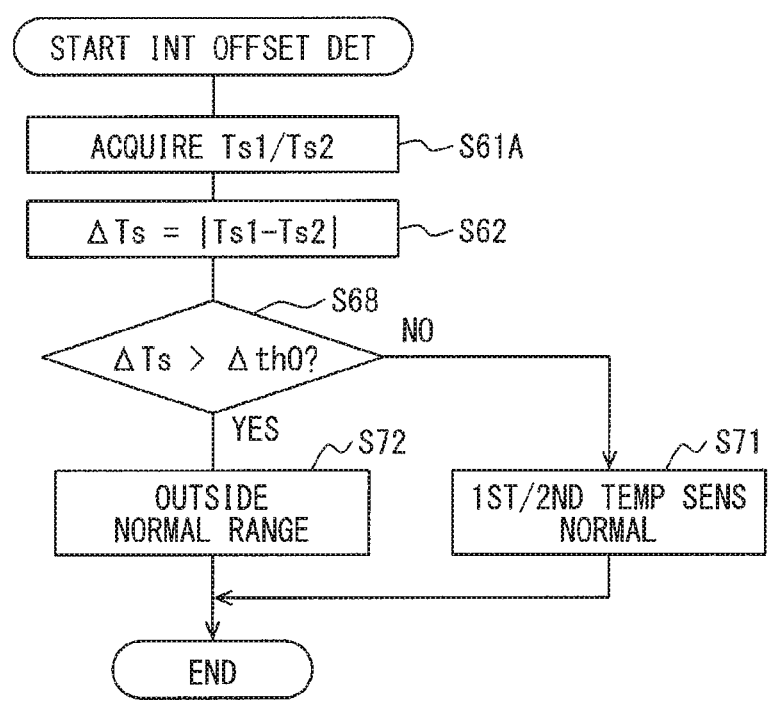
FIG. 14 is a flowchart of an intermediate offset determination.

The abnormality determination unit 34 acquires the first detected temperature Ts1 and the second detected temperature Ts2 in S61A of FIG. 14, and calculates a temperature deviation ΔTs (=|Ts1−Ts2|) in S62. If the temperature deviation ΔTs is larger than the normal deviation threshold ΔthO, the determination in S68 is YES, and it is determined in S72 that the temperature deviation is outside the normal range. When the temperature deviation ΔTs is equal to or less than the normal deviation threshold ΔthO, the determination in S68 is NO, and both of the first temperature sensor and the second temperature sensor are determined to be normal in S71.

Second Embodiment

Figure 15:
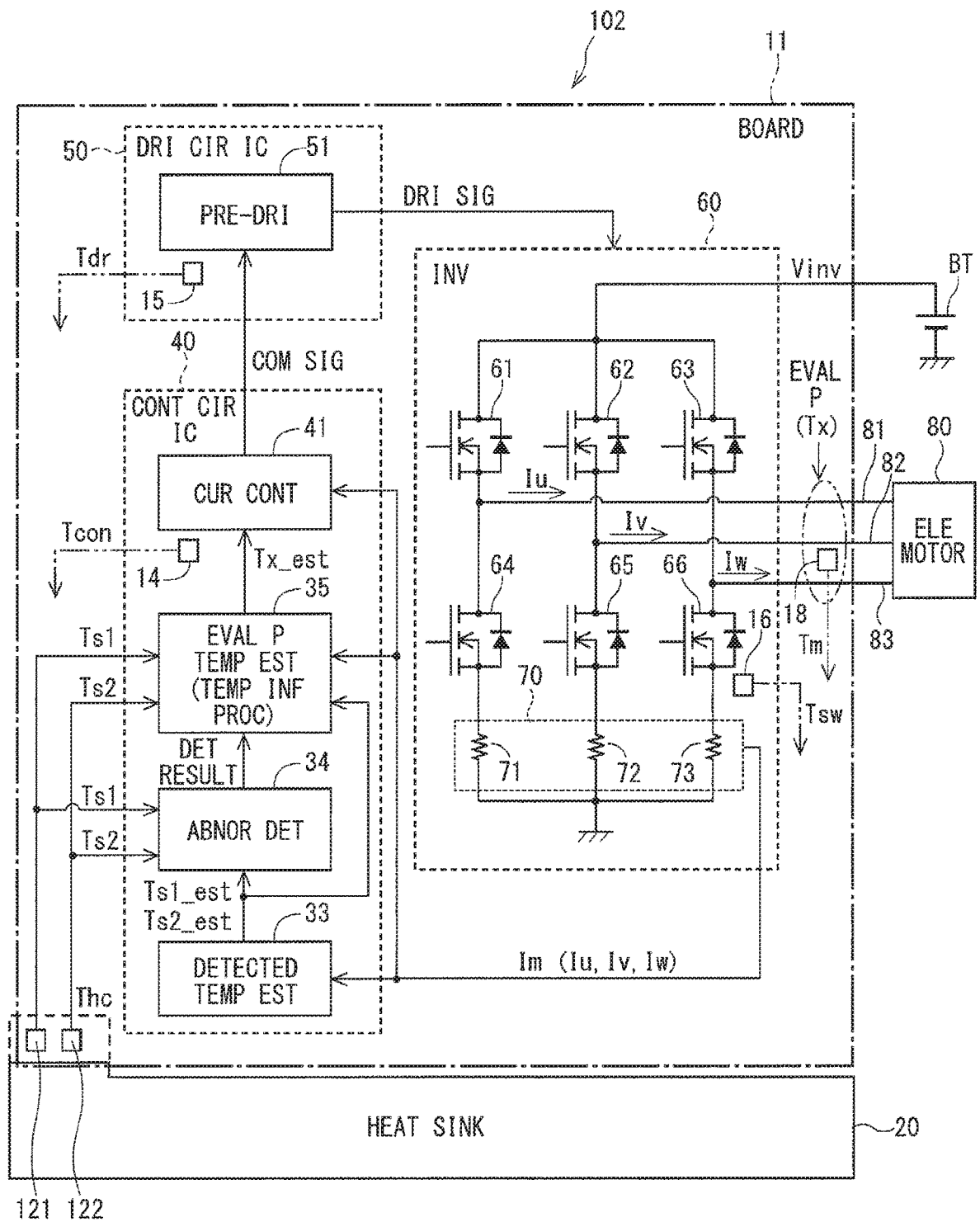
FIG. 15 is an overall configuration diagram of a motor control device according to a second embodiment.

A second embodiment will be described with reference to FIGS. 15 to 18. As shown in FIG. 15, a motor control device 102 according to the second embodiment further includes a detected temperature estimation unit 33 for the motor control device 101 of FIG. 1. The detected temperature estimation unit 33 estimates at least one of an estimation value Ts1_est of a first detected temperature and an estimation value Ts2_est of a second detected temperature based on an electric motor current Im. The detected temperature estimation values Ts1_est and Ts2_est are notified to an abnormality determination unit 34 and an evaluation portion temperature estimation unit 35. As in the above description of the evaluation portion temperature estimation unit 35, "estimate based on the current flowing through the electric motor" includes a case where the temperature is estimated based on an inverter applied voltage Vinv or the like correlated with an electric motor current Im.

Figure 16:
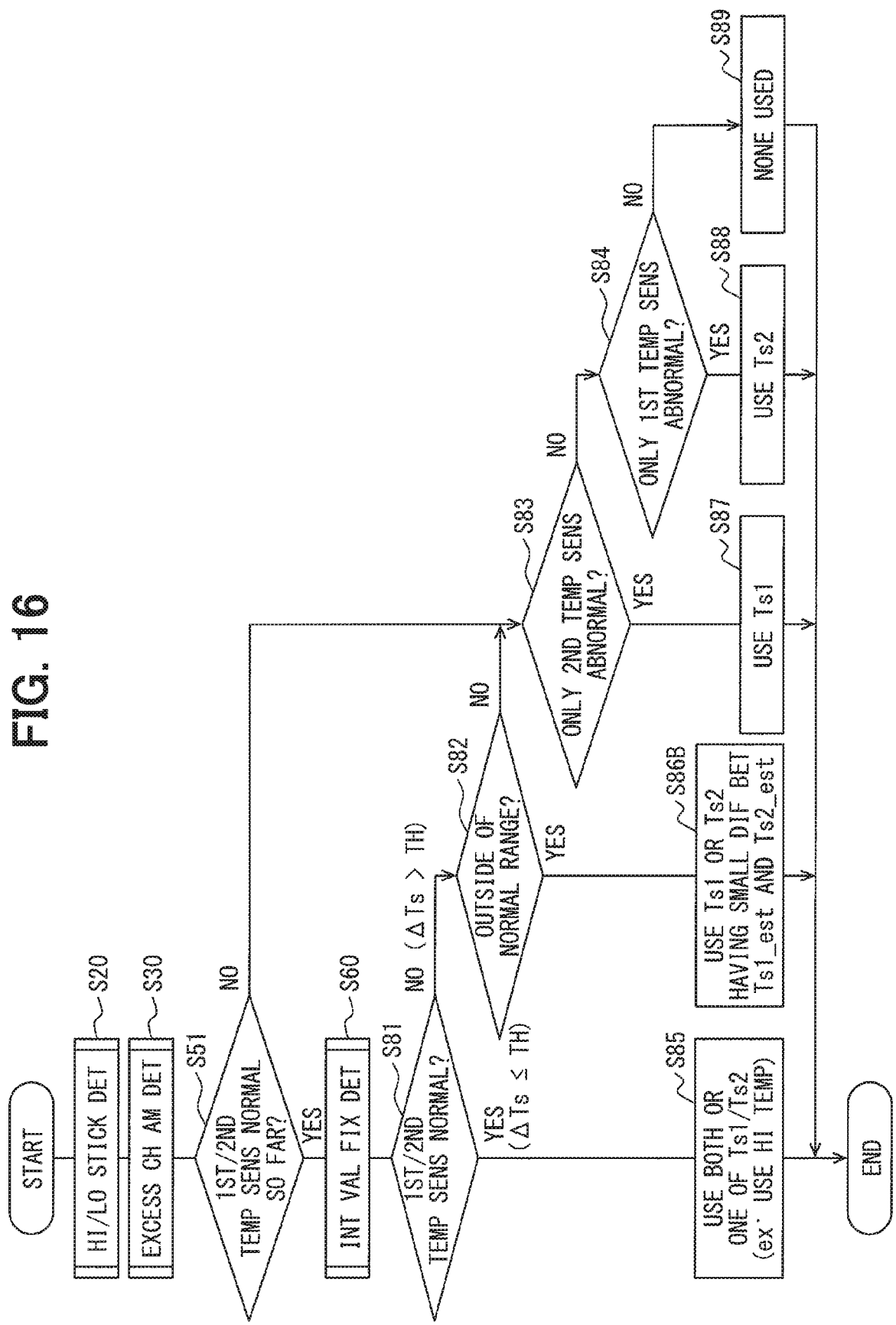
FIG. 16 is an overall flowchart of a temperature sensor abnormal state determination process according to the second embodiment.

As shown in FIG. 16, in the second embodiment, when it is determined that the temperature deviation is outside the normal range in S82 in the overall flowchart of FIG. 6, S86B is executed in place of S86A for selecting the higher temperature. In S86B, one of the first detected temperature Ts1 and the second detected temperature Ts2, which is smaller in difference from the detected temperature estimation values Ts1_est and Ts2_est is selected and used for the processing of the evaluation portion temperature estimation unit 35. In other words, according to the first embodiment, the temperature smaller in a difference from the detected temperature estimation value corresponds to "a temperature that meets a predefined condition". As a result, since the detected temperature close to the estimation value is used for the temperature information processing, the reliability of processing is improved.

Figure 17:
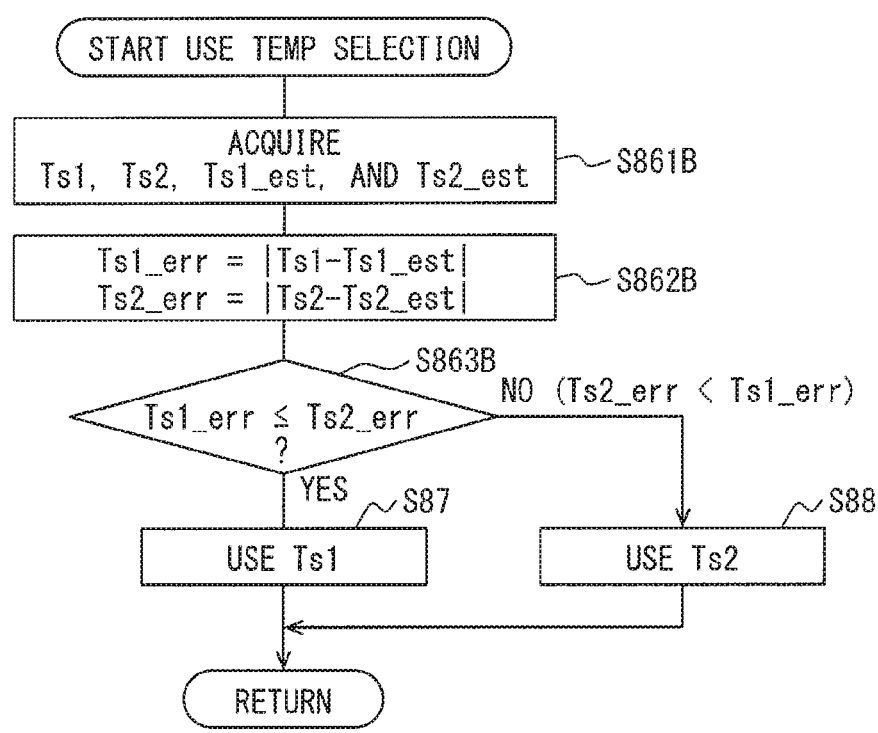
FIG. 17 is a sub-flowchart of a use temperature selection process in S86B of FIG. 16.

In more detail, as shown in FIG. 17, the abnormality determination unit 34 acquires a first detected temperature Ts1, a second detected temperature Ts2, a first detected temperature estimation value Ts1_est, and a second detected temperature estimation value Ts2_est in S861B. In S862B, deviations Ts1_err and Ts2_err between the detected temperatures Ts1 and Ts2 and the detected temperature estimation values Ts1_est and Ts2_est are calculated, respectively, by the following expressions.

$Ts1\_err=|Ts1-Ts1\_est|$ $Ts2\_err=|Ts2-Ts2\_est|$

If it is determined in S863B that Ts1_err is equal to or less than Ts2_err, the first detected temperature Ts1 is used in the processing in S87, and if it is determined that Ts1_err is more than Ts2_err, the second detected temperature Ts2 is used in the processing in S88.

Figure 18:
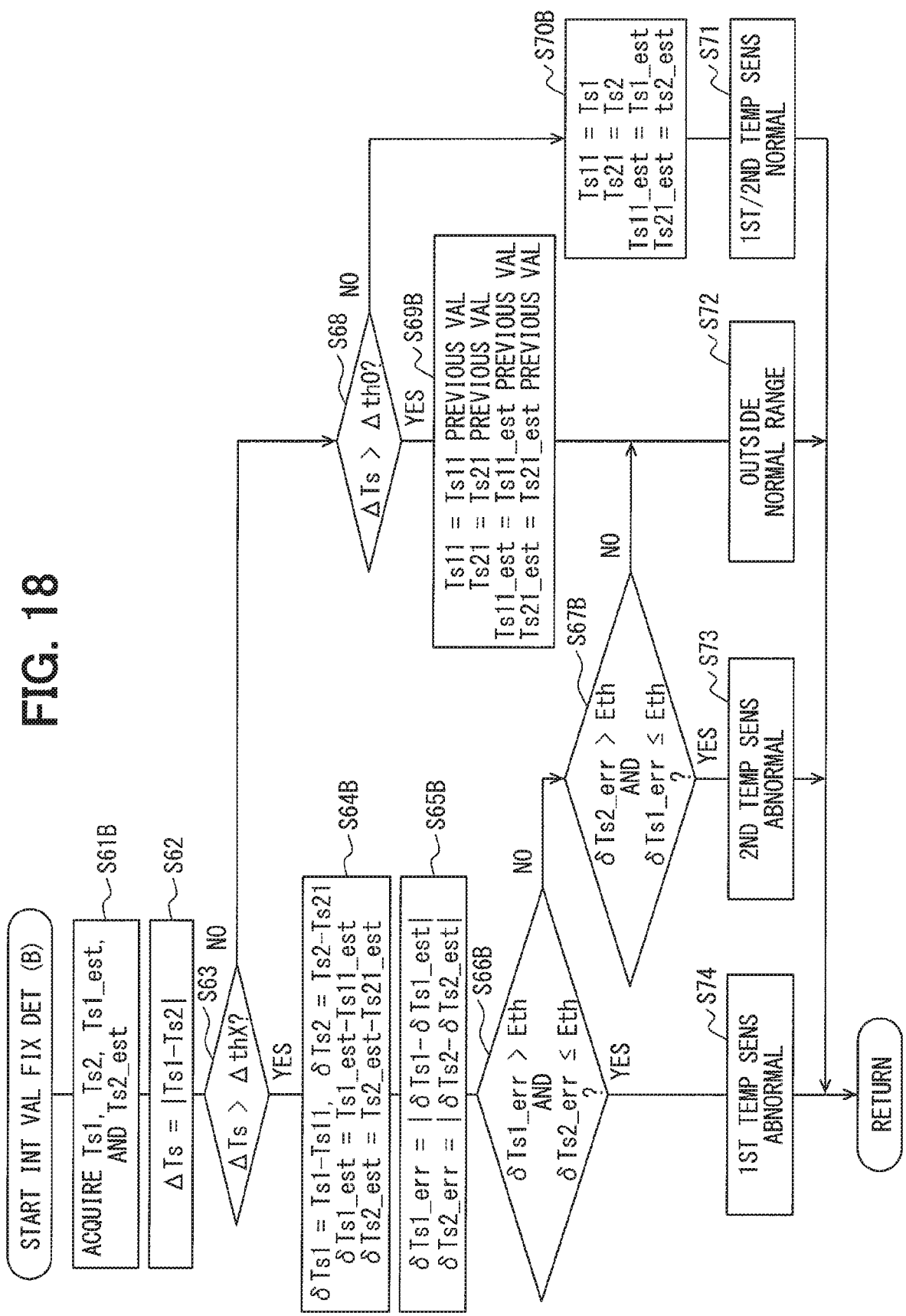
FIG. 18 is a flowchart of an intermediate value fixation determination (B) according to the second embodiment.

FIG. 18 shows another embodiment of the intermediate value fixation determination using the detected temperature estimation value Ts_est. In a time chart, the description of the same steps as those in FIG. 12 will be omitted referring to FIG. 11 which is the same as the first embodiment. The abnormality determination unit 34 holds the first detected temperature and the second detected temperature at the holding time point t1 as a first detected temperature holding value Ts11 and a second detected temperature holding value Ts21, respectively. The abnormality determination unit 34 holds the first detected temperature estimation value and the second detected temperature estimation value at the holding time point t1 as a first detected temperature estimation value holding value Ts11_est and a second detected temperature estimation value holding value Ts21_est, respectively.

In S61B of FIG. 18, the abnormality determination unit 34 acquires a first detected temperature Ts1, a second detected temperature Ts2, a first detected temperature estimation value Ts1_est, and a second detected temperature estimation value Ts2_est. When the temperature deviation ΔTs is larger than the large deviation threshold ΔthX and the determination in S63 is YES, in S64B, the temperature change amounts δTs1, δTs2 of the respective detected temperatures and the temperature change amounts δTs1_est, δTs2_est of the respective detected temperature estimation values are calculated by the following expressions.

$\delta Ts1=Ts1-Ts11$ $\delta Ts2=Ts2-Ts21$ $\delta Ts1\_est=Ts1\_est-Ts11\_est$ $\delta Ts2\_est=Ts2\_est-Ts21\_est$ In S65B, the temperature change amount deviations δTs1_err and δTs2_err between the temperature change amounts of the respective detected temperatures and the temperature change amounts of the detected temperature estimation values are calculated by the following expressions.

$\delta Ts1\_err=|\delta Ts1-\delta Ts1\_est|$ $\delta Ts2\_err=|\delta Ts2-\delta Ts2\_est|$ In S66B and S67B, the temperature change amount deviations δTs1_err and δTs2_err of the respective detected temperatures are compared with a change amount deviation threshold Eth. If δTs1_err is more than Eth and δTs2_err is equal to or less than Eth, the determination in S66B is YES, and it is determined in S74 that the first temperature sensor is abnormal. It should be noted that the determination condition of S66B may be expressed as the following expression with the use of a predetermined positive value K.

$\delta Ts1\_err>\delta Ts2\_err+K$

If δTs2_err is more than Eth and δTs1_err is equal to or less than Eth, the determination in S66B is NO, the determination in S67B is YES, and it is determined in S73 that the second temperature sensor is abnormal. In the case of NO in S67B, it is determined in S72 that the temperature deviation is outside the normal range. It should be noted that the determination condition of S67B may be expressed as the following expression with the use of a predetermined positive value K.

$\delta Ts2\_err>\delta Ts1\_err+K$

On the other hand, if the determination in S63 is NO and the determination in S68 is YES, the process proceeds to S69B. In S69B, previous values of detected temperature holding values Ts11 and Ts21 and respective detected temperature estimation value holding values Ts11_est and Ts21_est are updated as detected temperature holding values Ts11 and Ts21 and detected temperature estimation value holding values Ts11_est and Ts21_est. In addition, it Is determined in S72 that the temperature deviation is outside the normal range.

In case of NO in S68, in S70B, current values of detected temperatures Ts1 and Ts2 and detected temperature estimation values Ts1_est and Ts2_est are updated as detected temperature holding values Ts11 and Ts21 and detected temperature estimation value holding values Ts11_est and Ts21_est. It is determined that both of the first and second temperature sensors are normal in S71.

As described above, in the second embodiment, the detected temperatures of the respective temperature sensors are compared with the detected temperature estimation values estimated by the detected temperature estimation unit 33 and an intermediate value fixation determination is performed, thereby being capable of performing an appropriate abnormality determination including the case of outside of the normal range. The method can be similarly applied to the intermediate offset determination.

Third Embodiment

Figure 19:
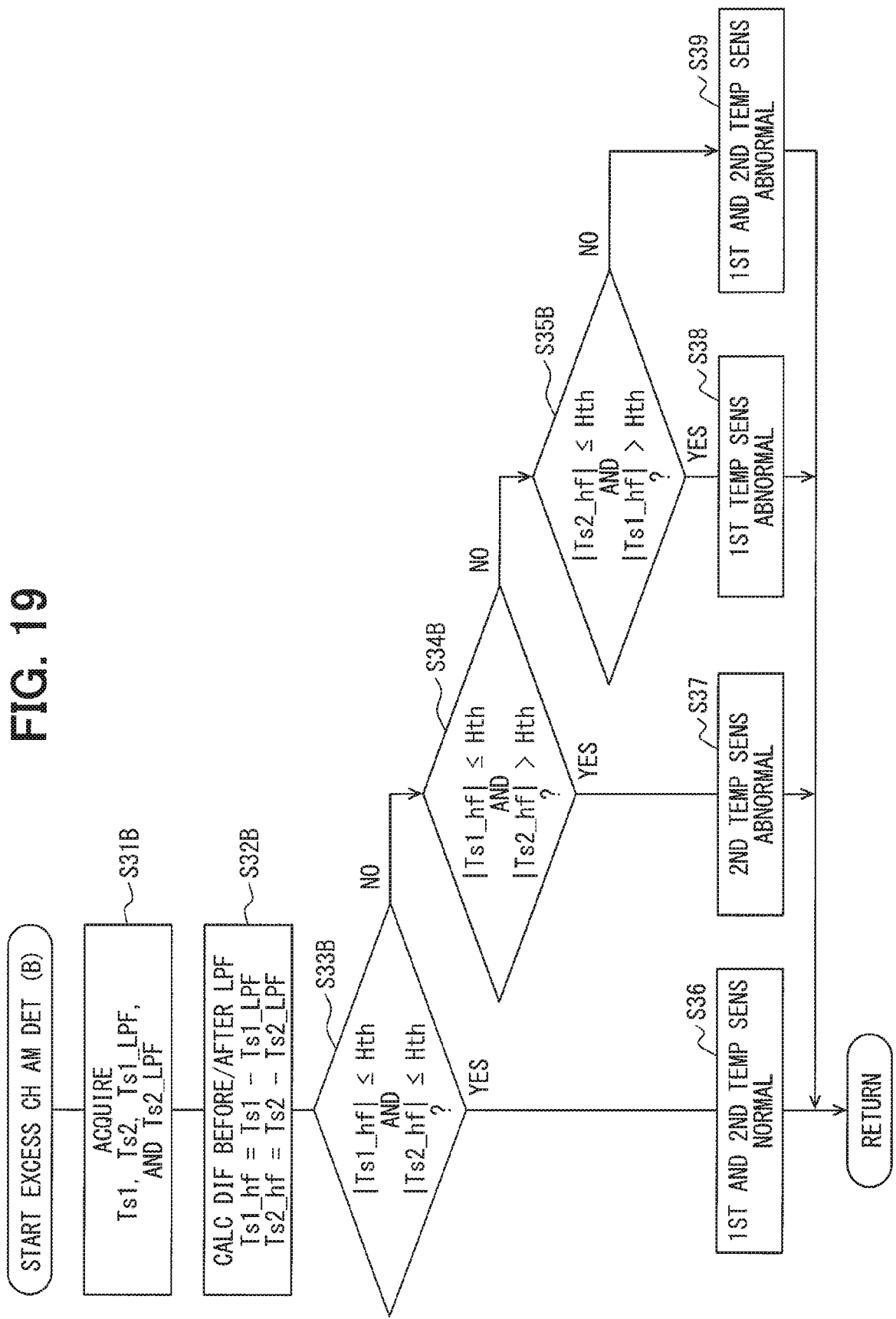
FIG. 19 is a flowchart of an excessive change amount determination (B) according to a third embodiment.

Next, third, fourth, and fifth embodiments will be described as other examples relating to the excessive change amount determination. First, the third embodiment will be described with reference to a flowchart of FIG. 19. An abnormality determination unit 34 according to the third embodiment internally includes a low-pass filter (hereinafter referred to as "LPF") and compares values before and after the LPF with each other for each of detected temperatures. A difference before and after the LPF means a high frequency component included in the detected temperature. When a positive high-frequency component exceeds a positive high frequency component threshold or a negative high-frequency component falls below a negative high frequency component threshold, the abnormality determination unit 34 determines that the temperature sensor is abnormal with the excessive change amount abnormality.

In S31B, the abnormality determination unit 34 acquires a first detected temperature Ts1, a second detected temperature Ts2, a first detected temperature Ts1_LPF after the LPF, and a second detected temperature Ts2_LPF after the LPF. In S32B, differences Ts1_hf and Ts2_hf before and after the LPF for each of the detected temperatures are calculated by the following expressions.

$$Ts1\_hf = Ts1 - Ts1\_LPF$$

$$Ts2\_hf = Ts2 - Ts2\_LPF$$

In S33B to S35B, it is determined whether absolute values |Ts1_hf| and |Ts2_hf| of differences of the respective detected temperatures before and after the LPF are equal to or lower than a high frequency component threshold Hth, or not. If both of |Ts1_hf| and |Ts2_hf| are equal to or less than Hth, the determination in S33B is YES, and it is determined in S36 that both of the first and second temperature sensors are normal.

When |Ts1_hf| is equal to or less than Hth and |Ts2_hf| is more than Hth, the determination in S33B is NO and the determination in S34B is YES, and the second temperature sensor is determined to be abnormal in S37. When |Ts2_hf| is equal to or less than Hth and |Ts1_hf| is more than Hth, the determination in S34B is NO and the determination in S35B is YES, and the first temperature sensor is determined to be abnormal in S38. If the determination in S35B is NO, it is determined that both of the first and second temperature sensors are abnormal in S39.

As in the first embodiment using differential values, instead of comparing the absolute values of the differences of the respective detected temperatures before and after the LPF with the common high frequency component threshold Hth, positive and negative difference values before and after the LPF may be compared with a positive high frequency component threshold +Hth and a negative high frequency component threshold −Hth. In that case, it is determined that the temperature sensor whose difference value is "−Hth or more and +Hth or less" is normal and the temperature sensor whose difference value is "less than −Hth or more than +Hth" is abnormal.

Fourth Embodiment

A fourth embodiment will be described with reference to a flowchart of FIG. 20. An abnormality determination unit 34 according to the fourth embodiment calculates maximum values and minimum values of respective detected temperatures Ts1 and Ts2 in a predetermined period corresponding to an N period of a sample period and sets differences between the maximum value and the minimum values as variation ranges Ts1_R and Ts2_R. When the variation ranges are larger than an upper limit value Rmax, the abnormality determination unit 34 determines that the temperature sensor is abnormal with the excessive change amount abnormality.

In S311C, the abnormality determination unit 34 acquires the first detected temperature Ts1 and the second detected temperature Ts2. In S312C, the maximum values Ts1_max, Ts2_max and the minimum values Ts1_min, Ts2_min of the respective detected temperatures in samples from N times before to this time are acquired. For example, if the current value of the first detected temperature is defined as "Ts1(n)", the maximum value Ts1_max and the minimum value Ts1_min are expressed by the following expressions. The same is applied to the second detected temperature Ts2.

$$Ts1\_max = \mathrm{MAX}(Ts1(n-N), \ldots Ts1(n-1), Ts1(n))$$

$$Ts1\_min = \mathrm{MIN}(Ts1(n-N), \ldots Ts1(n-1), Ts1(n))$$

In S32C, variation ranges Ts1_R and Ts2_R in a predetermined period are calculated by the following expressions.

$$Ts1\_R = Ts1\_max - Ts1\_min$$

$$Ts2\_R = Ts2\_max - Ts2\_min$$

In S33C to S35C, it is determined whether the variation ranges Ts1_R and Ts2_R of the respective detected temperatures are equal to or less than the variation range upper limit value Rmax, or not. When both of Ts1_R and Ts2_R are equal to or less than Rmax, the determination in S33C is YES, and it is determined in S36 that both of the first and second temperature sensors are normal.

If Ts1_R is equal to or less than Rmax and Ts2_R is more than Rmax, the determination in S33C is NO and the determination in S34C is YES. In S37, the second temperature sensor is determined to be abnormal. If Ts2_R is equal to or less than Rmax and Ts1_R is more than Rmax, the determination in S34C is NO and the determination in S35C is YES. In S38, the first temperature sensor is determined to be abnormal. If the determination in S35 is NO, it is determined that both of the first and second temperature sensors are abnormal in S39.

Fifth Embodiment

A fifth embodiment will be described with reference to flowcharts of FIGS. 21 and 22. In the fourth embodiment, the variation range is monitored in a predetermined period that is predetermined, whereas in a fifth embodiment, the variation range is monitored in a predetermined period after a temperature deviation ΔTs of detected temperatures Ts1 and Ts2 deviates from a normal range. The monitoring of the variation range is continued until the temperature deviation ΔTs falls within the normal range successively for a predetermined number of times.

Figure 21:
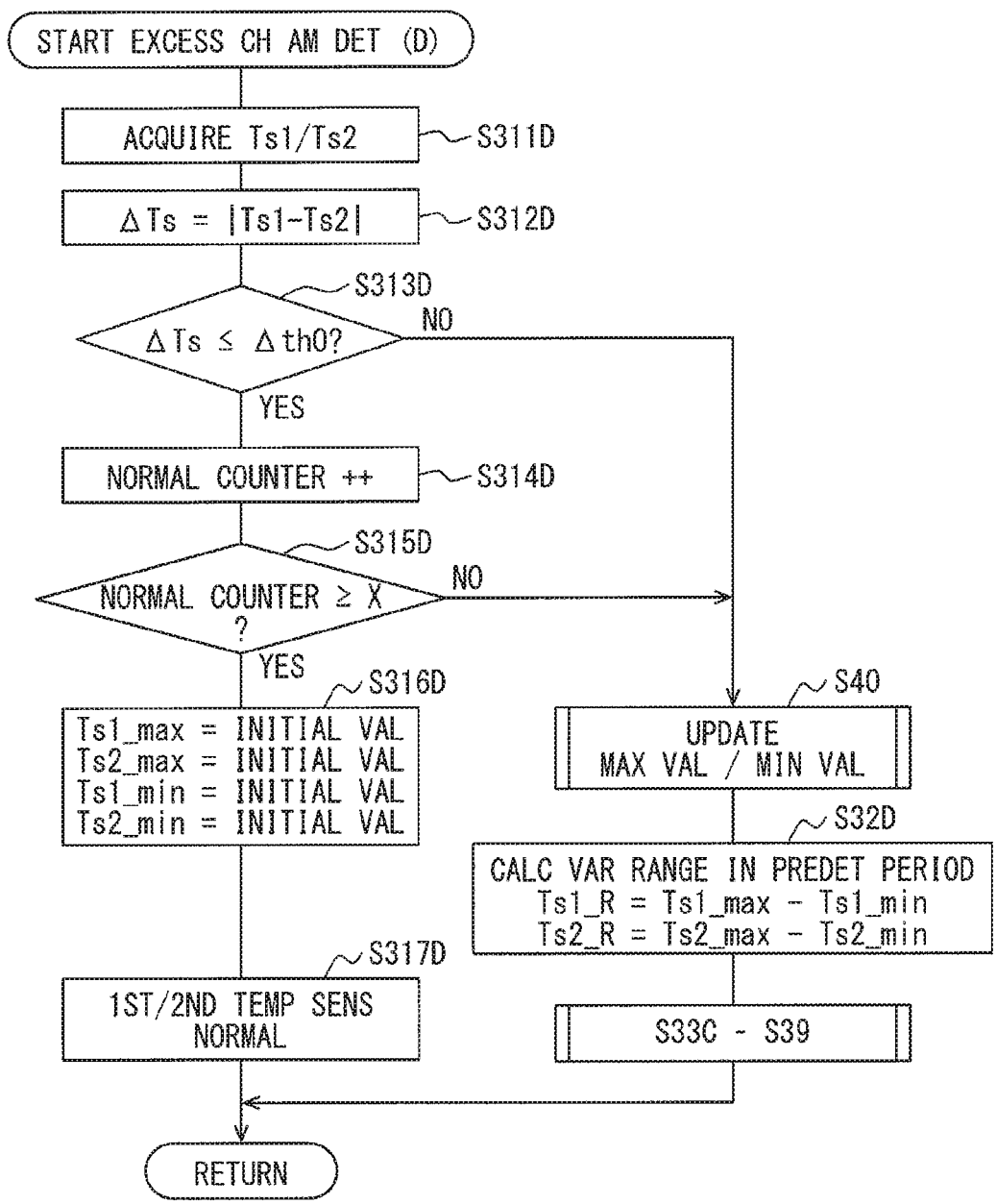
FIG. 21 is a flowchart of an excessive change amount determination (D) according to a fifth embodiment.

A abnormality determination unit 34 acquires the first detected temperature Ts1 and the second detected temperature Ts2 in S311D of FIG. 21, and calculates the temperature deviation ΔTs in S312D. When the temperature deviation ΔTs is equal to or less than the normal threshold value, the determination in S313D is YES, and a normal counter is incremented in S314D. When the normal counter reaches X times in S315D, the abnormality determination unit 34 determines that there is no need to monitor the variation range, and the process proceeds to S316D, where maximum values Ts1_max and Ts2_max and minimum values Ts1_min and Ts 2_min of the respective detected temperatures are updated as initial values. It is determined that both of the first and second temperature sensors are normal in S317D.

On the other hand, when the temperature deviation ΔTs exceeds the normal threshold and the determination in S313D is NO, or when the normal counter is less than X times and the determination in S315D is NO, a maximum value/minimum value update process is performed in S40.

Figure 22:
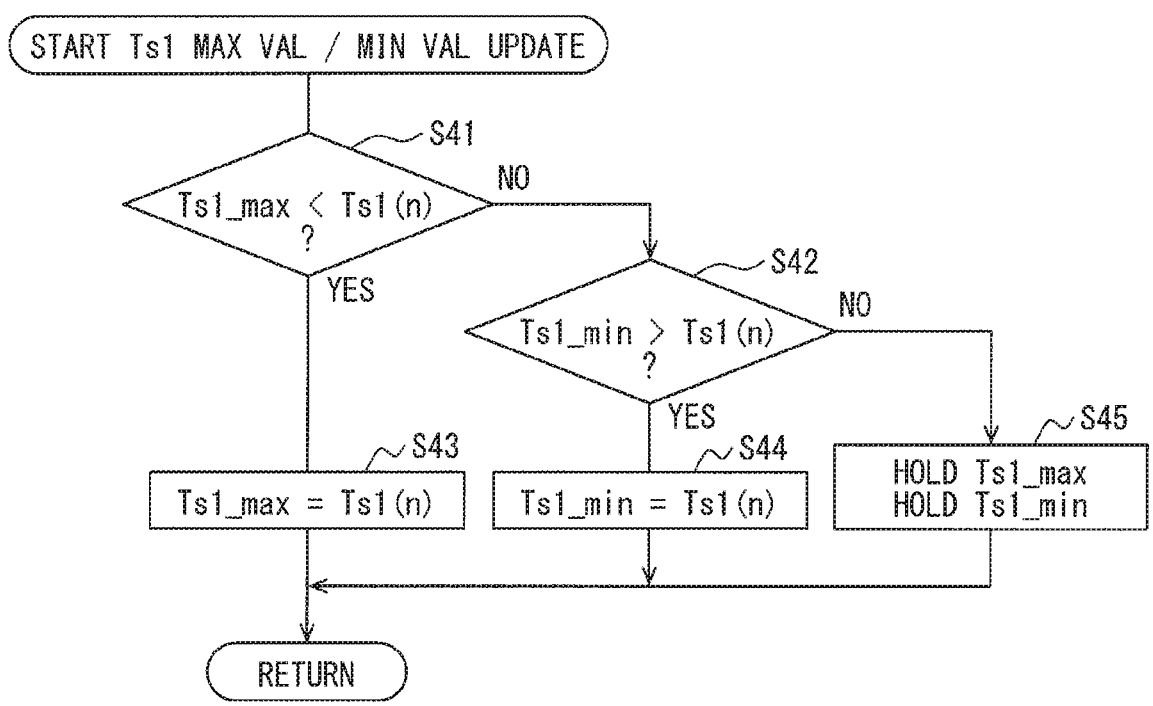
FIG. 22 is a sub-flowchart of a maximum value/minimum value update process in FIG. 21.

FIG. 22 shows the maximum value/minimum value update process for the first detected temperature Ts1. If the current value Ts1(n) of the detected temperature is larger than the maximum value Ts1_max at a current time point, the determination in S41 is YES, and the current value Ts1(n) is updated as the maximum value Ts1_max in S43. When the current value Ts1(n) is smaller than the minimum value Ts1_min at the current time point, the determination in S41 is NO and the determination in S42 is YES. In S44, the current value Ts1(n) is updated as the minimum value Ts1_min. In the case of NO in S42, the maximum value Ts1_max and the minimum value Ts1_min are held in S45. The same is applied to the second detected temperature Ts2.

Figure 20:
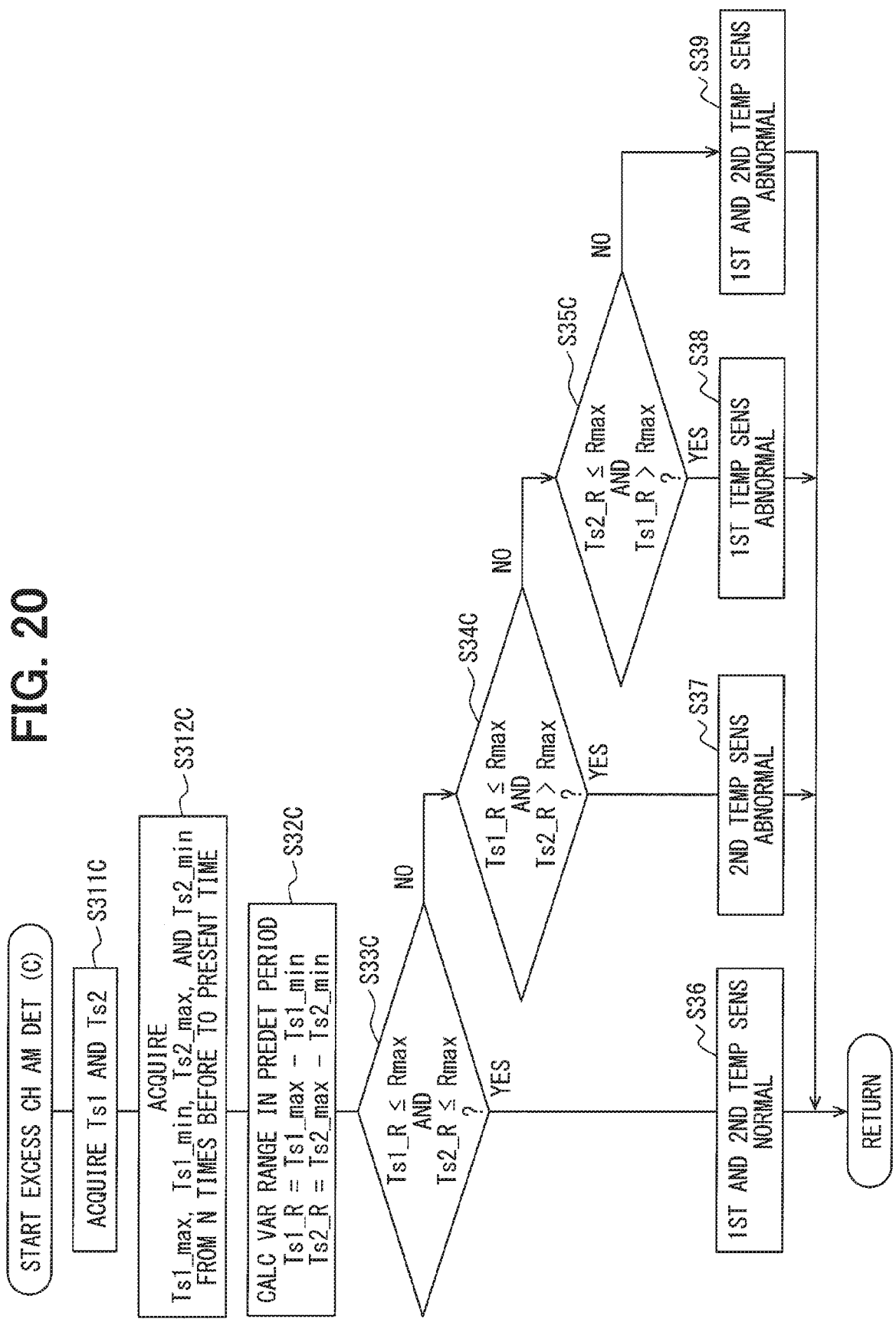
FIG. 20 is a flowchart of an excessive change amount determination (C) according to a fourth embodiment.

Returning to FIG. 21, in S32D, the variation range in a predetermined period after deviating from the normal range is calculated by the same equation as that in S32C of FIG. 20 based on the updated maximum value/minimum value. Thereafter, steps similar to S33C to S39 in FIG. 20 are executed, and an abnormal state of the temperature sensor is identified. As described above, according to the fifth embodiment, since the variation range is calculated according to the maximum value and the minimum value only in the predetermined period after the temperature deviation ΔTs has deviated from the normal range, an arithmetic load of the abnormality determination unit 34 can be reduced compared to the fourth embodiment.

Other Embodiments

The temperature information processing unit is not limited to the evaluation portion temperature estimation unit, and may perform any process based on the temperature information. Further, the motor control device according to the present disclosure is not limited to the electric power steering system of the vehicle, but may be applied to any system driving an electric motor. Variations on the placement of the temperature sensors, the type of the power converter, the control method by the current control unit, and so on employ the disclosure of "other embodiments" in Patent Literature 2.

In the above embodiment, as an example in which the temperature deviation is determined to be "outside the normal range", the cases of intermediate value fixation abnormality and the intermediate offset abnormality are shown. In addition, if the temperature deviation ΔTs exceeds the normal deviation threshold ΔthO and the abnormality of each temperature sensor cannot be identified, individually, by the Hi/Lo sticking determination or the excessive change amount determination, the temperature deviation may be determined to be "outside the normal range".

It is noted that a flowchart or the processing of the flowchart in the present application includes sections (also referred to as steps), each of which is represented, for instance, as S20. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control device that controls energization of an electric motor, comprising:
a board that radiates heat generated during energization to a heat sink;
a plurality of switching elements that are mounted on the board and provide a power converter which supplies an electric power to the electric motor;
a drive circuit IC that is mounted on the board and includes a pre-driver which outputs a drive signal to the plurality of switching elements;
a control circuit IC that is mounted on the board and includes a current control unit which calculates a command signal to the pre-driver based on an output command to the electric motor;
a first temperature sensor and a second temperature sensor that detect temperature at one or two places in at least one of the heat sink, the board, the control circuit IC, the drive circuit IC, the switching element and the electric motor;
a temperature information processing unit that performs a predetermined process using temperature information on at least one of a first detected temperature detected by the first temperature sensor and a second detected temperature detected by the second temperature sensor; and
an abnormality determination unit that determines an abnormal state of the first and second temperature sensors based on a first detected temperature equivalent amount of the first temperature sensor and a second detected temperature equivalent amount of the second temperature sensor, wherein:
the first detected temperature equivalent amount is defined by an output value of the first temperature sensor or the first detected temperature calculated by converting the output value of the first temperature sensor;
the second detected temperature equivalent amount is defined by an output value of the second temperature sensor or the second detected temperature calculated by converting the output value of the second temperature sensor;
a temperature deviation is defined as an absolute value of a difference between the first detected temperature equivalent amount and the second detected temperature equivalent amount;
an out-of-normal-range state is defined by a state where the temperature deviation exceeds a normal deviation threshold, and it is impossible to determine which one of the first and second temperature sensors is abnormal;
when the abnormality determination unit determines that both of the first temperature sensor and the second temperature sensor are normal, the temperature information processing unit uses at least one of the first detected temperature and the second detected temperature;

when the abnormality determination unit determines that one of the first temperature sensor and the second temperature sensor is abnormal and the other of the first and second temperature sensors is normal, the temperature information processing unit uses one of the first detected temperature and the second detected temperature which is obtained from the one of the first temperature sensor and the second temperature sensor as a normal temperature sensor; and when the abnormality determination unit determines that both of the first temperature sensor and the second temperature sensor fall in the out-of-normal-range state, the temperature information processing unit uses one of the first detected temperature and the second detected temperature which meets a predetermined condition.

2. The motor control device according to claim 1, wherein:

when the abnormality determination unit determines that both of the first temperature sensor and the second temperature sensor fall in the out-of-normal-range state, the temperature information processing unit uses higher one of the first detected temperature and the second detected temperature.

3. The motor control device according to claim 1, further comprising:

a detected temperature estimation unit that estimates a detected temperature estimation value, which is an estimation value of at least one of the first detected temperature equivalent amount and the second detected temperature equivalent amount, based on a current flowing in the electric motor, wherein:

when the abnormality determination unit determines that both of the first temperature sensor and the second temperature sensor fall in the out-of-normal-range state, the temperature information processing unit uses one of the first detected temperature and the second detected temperature which has a smaller difference from the detected temperature estimation value.

4. The motor control device according to claim 1, wherein:

when the abnormality determination unit determines that both of the first temperature sensor and the second temperature sensor are normal, the temperature information processing unit uses higher one of the first detected temperature and the second detected temperature.

5. The motor control device according to claim 1, wherein:

the abnormality determination unit holds, as first and second detected temperature holding values, the first and second detected temperature equivalent amounts at a holding time point;

the holding time point is earlier by one or more samples than an arrival time point at which the temperature deviation reaches a predetermined large deviation threshold;

the abnormality determination unit calculates first and second temperature change amounts by subtracting the first and second detected temperature holding values from the first and second detected temperature equivalent amounts at the arrive time point, respectively; and when an absolute value of one of the first and second temperature change amounts is larger than a change amount threshold, and an absolute value of the other of the first and second temperature change amounts is equal to or smaller than the change amount threshold, the abnormality determination unit determines that the one of the first temperature sensor and the second temperature sensor corresponding to the one of the first and second temperature change amounts is abnormal.

6. The motor control device according to claim 1, further comprising:

a detected temperature estimation unit that estimates a detected temperature estimation value, which is an estimation value of at least one of the first detected temperature equivalent amount and the second detected temperature equivalent amount, based on a current flowing in the electric motor, wherein:

the abnormality determination unit holds, as first and second detected temperature holding values, the first and second detected temperature equivalent amounts at a holding time point;

the holding time point is earlier by one or more samples than an arrival time point at which the temperature deviation reaches a predetermined large deviation threshold;

the abnormality determination unit holds, as first and second detected temperature estimation value holding values, the first and second detected temperature estimation values at the holding time point;

the abnormality determination unit calculates first and second temperature change amounts by subtracting the first and second detected temperature holding values from the first and second detected temperature equivalent amounts at the arrive time point, respectively;

the abnormality determination unit calculates first and second temperature estimation value change amounts by subtracting the first and second detected temperature estimation value holding values from the first and second detected temperature estimation values at the arrive time point, respectively;

the abnormality determination unit calculates first and second temperature change amount deviations, which are deviations between the first and second temperature change amounts and the first and second temperature estimation value change amounts, respectively; and when one of the first and second temperature change amount deviations is larger than a change amount deviation threshold, and the other of the first and second temperature change amount deviations is equal to or smaller than the change amount deviation threshold, the abnormality determination unit determines that the one of the first temperature sensor and the second temperature sensor corresponding to the one of the first and second temperature change amount deviations is abnormal.

7. The motor control device according to claim 1, wherein:

the abnormality determination unit calculates first and second time differential values of the first and second detected temperature equivalent amounts; and when one of the first and second time differential values is smaller than a negative differential threshold or larger than a positive differential threshold, and the other of the first and second time differential values is equal to or larger than the negative differential threshold and equal to or smaller than the positive differential threshold, the abnormality determination unit determines that the one of the first temperature sensor and the second temperature sensor corresponding to the one of the first and second time differential values is abnormal.

8. The motor control device according to claim 1, wherein:
the abnormality determination unit calculates first and second values obtained by processing the first and second detected temperature equivalent amounts with a low-pass filter;
the abnormality determination unit calculates first and second differences between the first and second detected temperature equivalent amounts before processing with the low pass filter and the first and second values after processing with the low pass filter;
when one of the first and second differences is smaller than a negative high frequency component threshold value or larger than a positive high frequency component threshold, and the other of the first and second differences is equal to or larger than the negative high frequency component threshold and equal to or smaller than the positive high frequency component threshold, the abnormality determination unit determines that the one of the first temperature sensor and the second temperature sensor corresponding to the one of the first and second differences is abnormal.

9. The motor control device according to claim 1, wherein:
the abnormality determination unit calculates first and second variation ranges that are differences between maximum values and minimum values of the first and second detected temperature equivalent amounts in a predetermined period; and
when one of the first and second variation ranges is larger than a variation range upper limit value, and the other of the first and second variation ranges is equal to or smaller than the variation range upper limit value, the abnormality determination unit determines that the one of the first temperature sensor and the second temperature sensor corresponding to the one of the first and second variation ranges is abnormal.

10. The motor control device according to claim 1, wherein:
when one of the first and second detected temperature equivalent amounts is lower than a lower limit temperature threshold or higher than an upper limit temperature threshold, and the other of the first and second detected temperature equivalent amounts is equal to or higher than the lower limit temperature threshold and equal to or lower than the upper limit temperature threshold, the abnormality determination unit determines that the one of the first temperature sensor and the second temperature sensor corresponding to the one of the first and second detected temperature equivalent amounts is abnormal.

11. The motor control device according to claim 1, wherein:
at least one of the first temperature sensor and the second temperature sensor detects a temperature of the control circuit IC, the drive circuit IC, or the switching element embedded in an IC package; and
the at least one of the first temperature sensor and the second temperature sensor is arranged inside the IC package.

12. The motor control device according to claim 1, wherein:
at least one of the first temperature sensor and the second temperature sensor is arranged on the board contacting the heat sink.

13. The motor control device according to claim 1, wherein:
the temperature information processing unit functions as an evaluation portion temperature estimation unit that estimates a temperature of one or more evaluation portions selected from the heat sink, the board, the control circuit IC, the drive circuit IC, the switching element, and the electric motor, based on at least one of the first detected temperature and the second detected temperature and a current flowing through the electric motor.

14. The motor control device according to claim 13, wherein:
the current control unit sets a current limit value for a current command value to be lower as an estimated temperature of the one or more evaluation portions is higher when the estimated temperature of the one or more evaluation portions falls within a predetermined temperature range.

15. The motor control device according to claim 13, wherein:
the evaluation portion temperature estimation unit estimates temperatures of a plurality of the evaluation portions; and
the current control unit limits the current command value using a minimum value of the plurality of current limit values set for each of a plurality of estimated temperatures.

* * * * *